US012561800B2

(12) United States Patent
Murthy et al.

(10) Patent No.: US 12,561,800 B2
(45) Date of Patent: Feb. 24, 2026

(54) SUPER RESOLUTION FOR ELECTRONIC 4D (E4D) CARDIOVASCULAR ULTRASOUND (CVUS) PROBES

(71) Applicant: GE Precision Healthcare LLC, Wauwatosa, WI (US)

(72) Inventors: Prasad Sudhakara Murthy, Bengaluru (IN); Pavan Annangi, Bengaluru (IN); Tore G. Bjastad, Oslo (NO); Rohan Patil, Bengaluru (IN); Anders Sørnes, Oslo (NO); Erik Normann Steen, Oslo (NO); Abhijit Patil, Bengaluru (IN); Vikram Reddy Melapudi, Bengaluru (IN)

(73) Assignee: GE Precision Healthcare LLC, Waukesha, WI (US)

( * ) Notice: Subject to any disclaimer, the term of this patent is extended or adjusted under 35 U.S.C. 154(b) by 515 days.

(21) Appl. No.: 18/091,776

(22) Filed: Dec. 30, 2022

(65) Prior Publication Data

US 2024/0221153 A1 Jul. 4, 2024

(51) Int. Cl.
*G06T 7/00* (2017.01)
(52) U.S. Cl.
CPC .. *G06T 7/0012* (2013.01); *G06T 2207/10081* (2013.01); *G06T 2207/20081* (2013.01)
(58) Field of Classification Search
CPC ......... G06T 7/0012; G06T 2207/10081; G06T 2207/20081; A61B 8/0891
See application file for complete search history.

(56) References Cited

U.S. PATENT DOCUMENTS

| | | | |
|---|---|---|---|
| 7,988,632 B2 | 8/2011 | Yao et al. | |
| 9,687,210 B2 | 6/2017 | Prater et al. | |
| 11,354,791 B2 | 6/2022 | Tsymbalenko | |
| 11,364,013 B2 | 6/2022 | Hope Simpson et al. | |
| 2008/0154133 A1* | 6/2008 | Shiki ................... | G01S 7/52095 |
| | | | 600/443 |
| 2009/0149757 A1 | 6/2009 | Liu et al. | |
| 2011/0172532 A1* | 7/2011 | Yoo ....................... | G01S 7/5205 |
| | | | 600/443 |
| 2012/0157845 A1* | 6/2012 | Rabben .................. | A61B 8/523 |
| | | | 600/443 |

(Continued)

OTHER PUBLICATIONS

"Deep Learning For Ultrasound Beamforming", https://arxiv.org/pdf/2109.11431.pdf, 32 pages.

(Continued)

*Primary Examiner* — Van D Huynh
(74) *Attorney, Agent, or Firm* — McAndrews, Held & Malloy, Ltd.; Daniel Bissing

(57) ABSTRACT

Systems and methods are provided for super resolution for electronic 4D (e4D) cardiovascular ultrasound (CVUS) probes. In a medical imaging system, signals associated with a medical imaging technique may be acquired and processed, with the processing including applying one or both of a first type of correction to address a first type of degradation and a second type of correction to address a second type of degradation, with the first type of degradation being based on or caused by sparse acquisition, and the second type of degradation being based on or caused by choice of beamforming/reconstruction methodology.

20 Claims, 16 Drawing Sheets

(56) References Cited

U.S. PATENT DOCUMENTS

| | | | |
|---|---|---|---|
| 2014/0114194 A1* | 4/2014 | Kanayama | G16H 50/20 |
| | | | 600/459 |
| 2015/0031995 A1* | 1/2015 | Guracar | G01S 7/52095 |
| | | | 600/431 |
| 2017/0143301 A1* | 5/2017 | Nakatsuji | A61B 8/5276 |
| 2017/0238907 A1* | 8/2017 | Kommu Chs | A61B 8/5223 |
| 2018/0125460 A1* | 5/2018 | Perrey | A61B 8/523 |
| 2020/0222025 A1 | 7/2020 | Prater et al. | |
| 2020/0245973 A1* | 8/2020 | Cox | A61B 8/4254 |
| 2021/0183521 A1* | 6/2021 | Bae | G16H 50/50 |

OTHER PUBLICATIONS

"Deep Learning For Ultrasound Beamforming", https://arxiv.org/pdf/2109.11431.pdf, Sep. 23, 2021, 32 pages.

* cited by examiner

740 iSTB/2x based frame

RTB/full Tx based frame

Narrow Focused

800

810

820

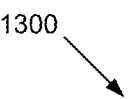

1300

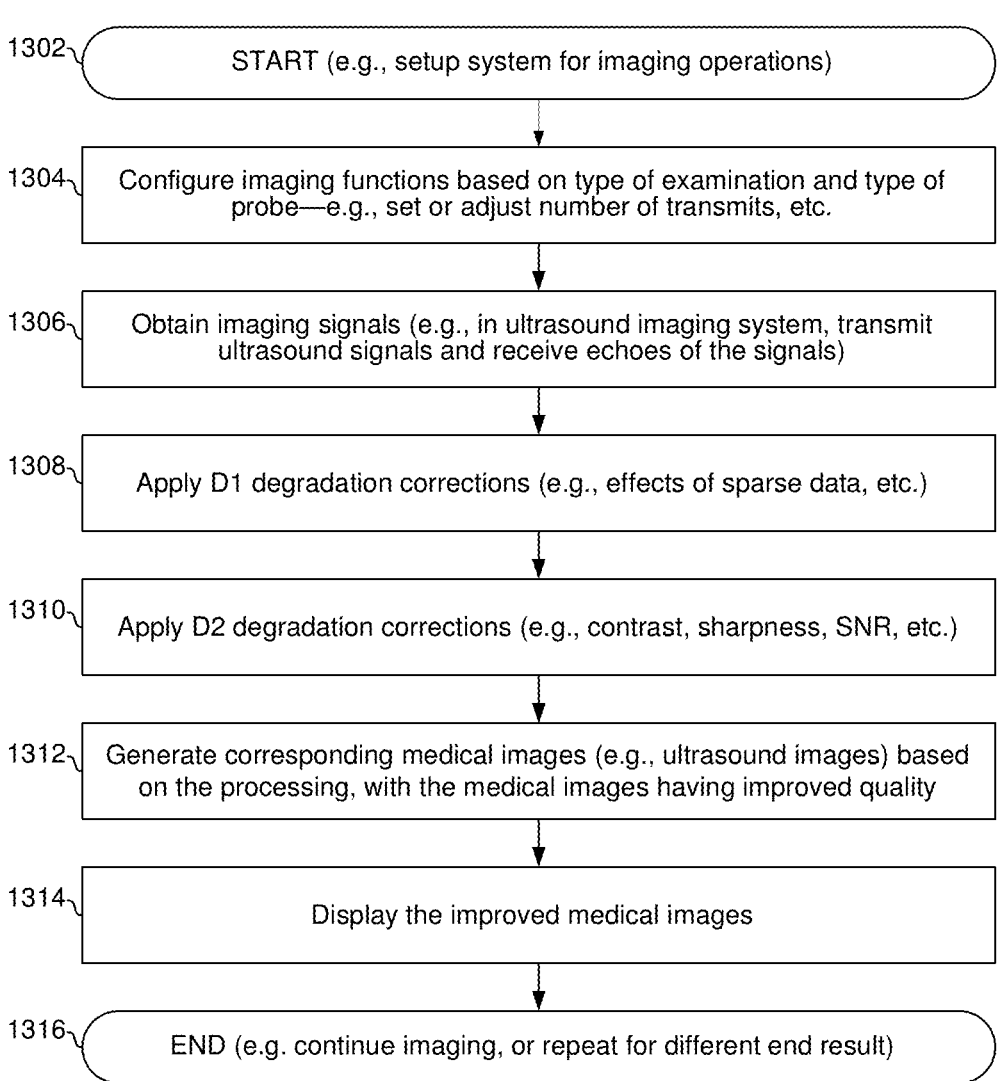

1302 — START (e.g., setup system for imaging operations)

1304 — Configure imaging functions based on type of examination and type of probe—e.g., set or adjust number of transmits, etc.

1306 — Obtain imaging signals (e.g., in ultrasound imaging system, transmit ultrasound signals and receive echoes of the signals)

1308 — Apply D1 degradation corrections (e.g., effects of sparse data, etc.)

1310 — Apply D2 degradation corrections (e.g., contrast, sharpness, SNR, etc.)

1312 — Generate corresponding medical images (e.g., ultrasound images) based on the processing, with the medical images having improved quality 1314 — Display the improved medical images 1316 — END (e.g. continue imaging, or repeat for different end result)

FIG. 13

SUPER RESOLUTION FOR ELECTRONIC 4D (E4D) CARDIOVASCULAR ULTRASOUND (CVUS) PROBES

FIELD

Aspects of the present disclosure relate to medical imaging solutions. More specifically, certain embodiments relate to methods and systems for super resolution for electronic 4D (e4D) cardiovascular ultrasound (CVUS) probes.

BACKGROUND

Various medical imaging techniques may be used, such as in imaging organs and soft tissues in a human body. Examples of medical imaging techniques include ultrasound imaging, computed tomography (CT) scans, magnetic resonance imaging (MRI), etc. The manner by which images are generated during medical imaging depends on the particular technique.

For example, ultrasound imaging uses real-time, non-invasive high frequency sound waves to produce ultrasound images, typically of organs, tissues, objects (e.g., fetus) inside the human body. Images produced or generated during medical imaging may be two-dimensional (2D), three-dimensional (3D), and/or four-dimensional (4D) images (essentially real-time/continuous 3D images). During medical imaging, imaging datasets (including, e.g., volumetric imaging datasets during 3D/4D imaging) are acquired and used in generating and rendering corresponding images (e.g., via a display) in real-time.

Existing medical imaging solutions may have some limitations. For example, use of medical imaging systems in conjunction with certain types of examinations (e.g., of certain types of organs, tissues, and/or structures, bodily functions, etc.) may have some limitations and/or may pose certain challenges, particularly with respect to such aspects as assessing outcome of the examination, and presenting certain types of feedback information to the user during the examinations. Further, in some instances operation of certain components of medical imaging systems, such as the medical imaging probes, may pose certain challenges, particularly in conjunction with conditions that may cause damage to these components. Conventional and traditional approaches may not sufficiently address or overcome such limitations or challenges.

Further limitations and disadvantages of conventional and traditional approaches will become apparent to one of skill in the art, through comparison of such systems with some aspects of the present disclosure, as set forth in the remainder of the present application with reference to the drawings.

BRIEF SUMMARY

System and methods are provided for super resolution for electronic 4D (e4D) cardiovascular ultrasound (CVUS) probes, substantially as shown in and/or described in connection with at least one of the figures, as set forth more completely in the claims.

These and other advantages, aspects and novel features of the present disclosure, as well as details of one or more illustrated example embodiments thereof, will be more fully understood from the following description and drawings.

BRIEF DESCRIPTION OF THE DRAWINGS

FIG. 13 illustrates a flowchart of an example process for medical imaging with use of super resolution in accordance with the present disclosure.

DETAILED DESCRIPTION

Figure 1:
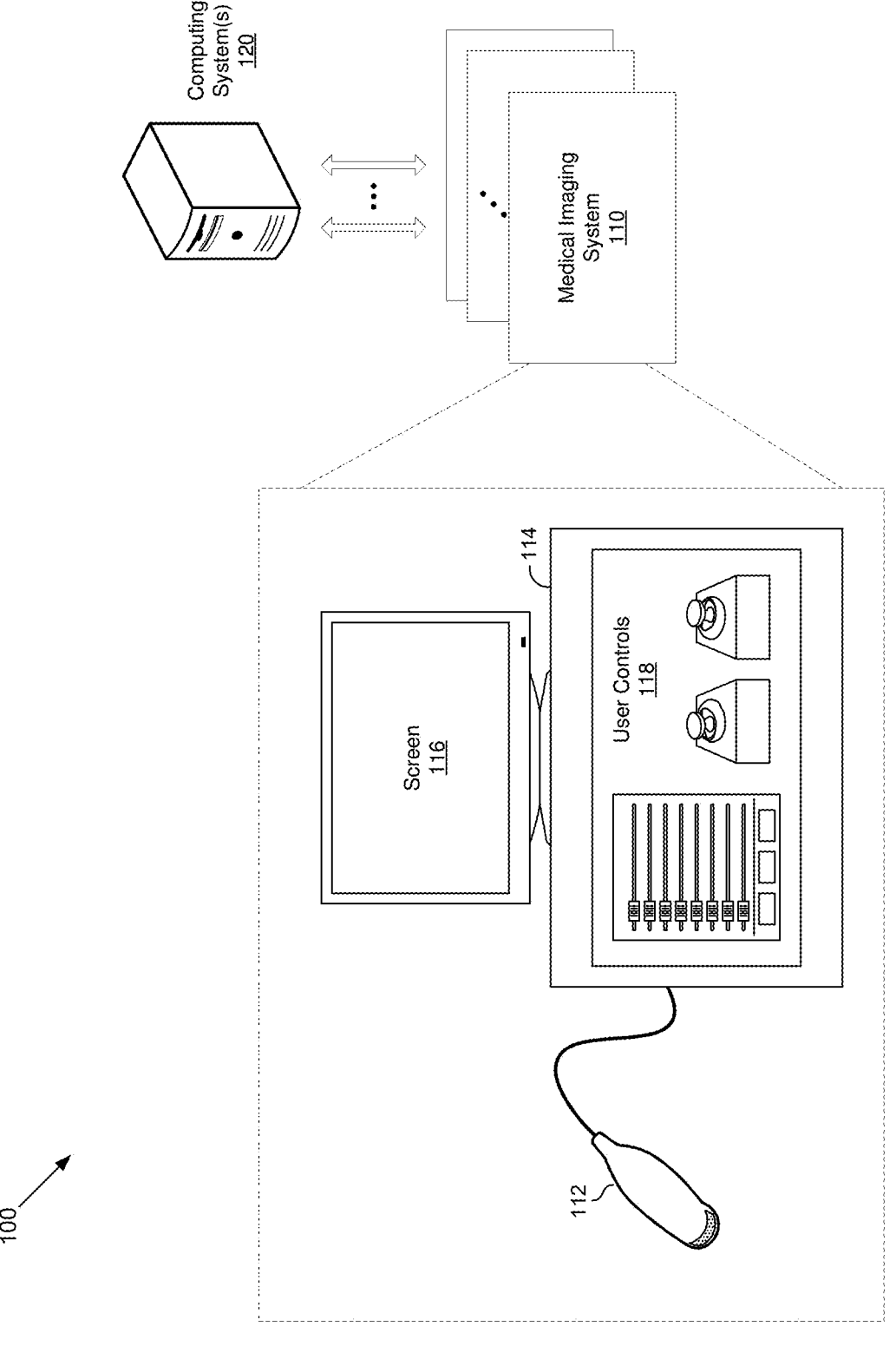
FIG. 1 illustrates an example medical imaging arrangement.

Certain implementations in accordance with the present disclosure may be directed to super resolution for electronic 4D (e4D) cardiovascular ultrasound (CVUS) probes. The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising." "including." or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" as used in the context of ultrasound imaging is used to refer to an ultrasound mode such as B-mode (2D mode), M-mode, three-dimensional (3D) mode, CF-mode, PW Doppler, CW Doppler, MGD, and/or sub-modes of B-mode and/or CF such as Shear Wave Elasticity Imaging (SWEI), TVI, Angio, B-flow, BMI, BMI_ Angio, and in some cases also MM, CM, TVD where the "image" and/or "plane" includes a single beam or multiple beams.

In addition, as used herein, the phrase "pixel" also includes embodiments where the data is represented by a "voxel." Thus, both the terms "pixel" and "voxel" may be used interchangeably throughout this document.

Furthermore, the term processor or processing unit, as used herein, refers to any type of processing unit that can carry out the required calculations needed for the various embodiments, such as single or multi-core: CPU, Accelerated Processing Unit (APU), Graphics Board, DSP, FPGA, ASIC, or a combination thereof.

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". In addition, forming of images may be performed using channel combinations that may originate from more than one transmit event (e.g., synthetic aperture techniques).

In various embodiments, processing to form images is performed in software, firmware, hardware, or a combination thereof. The processing may include use of beamforming.

FIG. 1 illustrates an example medical imaging arrangement. Shown in FIG. 1 is an example medical imaging arrangement 100 that comprises one or more medical imaging systems 110 and one or more computing systems 120. The medical imaging arrangement 100 (including various elements thereof) may be configured to support medical imaging and solutions associated therewith.

The medical imaging system 110 comprise suitable hardware, software, or a combination thereof, for supporting medical imaging—that is enabling obtaining data used in generating and/or rendering images during medical imaging exams. Examples of medical imaging include ultrasound imaging, computed tomography (CT) scans, magnetic resonance imaging (MRI), etc. This may entail capturing of particular type of data, in particular manner, which may in turn be used in generating data for the images. For example, the medical imaging system 110 may be an ultrasound imaging system, configured for generating and/or rendering ultrasound images.

As shown in FIG. 1, the medical imaging system 110 may comprise a scanner device 112, which may be portable and movable, and a display/control unit 114. The scanner device 112 may be configured for generating and/or capturing particular type of imaging signals (and/or data corresponding thereto), such as by being moved over a patient's body (or part thereof), and may comprise suitable circuitry for performing and/or supporting such functions. The scanner device 112 may be an ultrasound probe, MRI scanner, CT scanner, or any suitable imaging device. For example, where the medical imaging system 110 is an ultrasound system, the scanner device 112 may emit ultrasound signals and capture echo ultrasound images.

The display/control unit 114 may be configured for displaying images (e.g., via a screen 116). In some instances, the display/control unit 114 may further be configured for generating the displayed images, at least partly. Further, the display/control unit 114 may also support user input/output. For example, the display/control unit 114 may provide (e.g., via the screen 116), in addition to the images, user feedback (e.g., information relating to the system, functions thereof, settings thereof, etc.). The display/control unit 114 may also support user input (e.g., via user controls 118), such as to allow controlling of the medical imaging. The user input may be directed to controlling display of images, selecting settings, specifying user preferences, requesting feedback, etc.

In some implementations, the medical imaging arrangement 100 may also incorporate additional and dedicated computing resources, such as the one or more computing systems 120. In this regard, each computing system 120 may comprise suitable circuitry, interfaces, logic, and/or code for processing, storing, and/or communication data. The computing system 120 may be dedicated equipment configured particularly for use in conjunction with medical imaging, or it may be a general purpose computing system (e.g., personal computer, server, etc.) set up and/or configured to perform the operations described hereinafter with respect to the computing system 120. The computing system 120 may be configured to support operations of the medical imaging systems 110, as described below. In this regard, various functions and/or operations may be offloaded from the imaging systems. This may be done to streamline and/or centralize certain aspects of the processing, to reduce cost—e.g., by obviating the need to increase processing resources in the imaging systems.

The computing systems 120 may be set up and/or arranged for use in different ways. For example, in some implementations a single computing system 120 may be used; in other implementations multiple computing systems 120, either configured to work together (e.g., based on distributed-processing configuration), or separately, with each computing system 120 being configured to handle particular aspects and/or functions, and/or to process data only for particular medical imaging systems 110. Further, in some implementations, the computing systems 120 may be local (e.g., co-located with one or more medical imaging systems 110, such within the same facility and/or same local network); in other implementations, the computing systems 120 may be remote and thus can only be accessed via remote connections (e.g., via the Internet or other available remote access techniques). In a particular implementation, the computing systems 120 may be configured in cloud-based manner, and may be accessed and/or used in substantially similar way that other cloud-based systems are accessed and used.

Once data is generated and/or configured in the computing system 120, the data may be copied and/or loaded into the medical imaging systems 110. This may be done in different ways. For example, the data may be loaded via directed connections or links between the medical imaging systems 110 and the computing system 120. In this regard, communications between the different elements in the medical imaging arrangement 100 may be done using available wired and/or wireless connections, and/or in accordance any suitable communication (and/or networking) standards or protocols. Alternatively, or additionally, the data may be loaded into the medical imaging systems 110 indirectly. For example, the data may be stored into suitable machine readable media (e.g., flash card, etc.), which are then used to load the data into the medical imaging systems 110 (on-site, such as by users of the systems (e.g., imaging clinicians) or authorized personnel), or the data may be downloaded into local communication-capable electronic devices (e.g., laptops, etc.), which are then used on-site (e.g., by users of the systems or authorized personnel) to upload the data into the medical imaging systems 110, via direct connections (e.g., USB connector, etc.).

In operation, the medical imaging system 110 may be used in generating and presenting (e.g., rendering or displaying) images during medical exams, and/or in supporting user input/output in conjunction therewith. The images may be 2D, 3D, and/or 4D images. The particular operations or functions performed in the medical imaging system 110 to facilitate the generating and/or presenting of images depends on the type of system—that is, the manner by which the data corresponding to the images is obtained and/or generated. For example, in computed tomography (CT) scans based imaging, the data is based on emitted and captured x-rays signals. In ultrasound imaging, the data is based on emitted and echo ultrasound signals. This described in more details with respect to the example ultrasound-based implementation illustrated in and described with respect to FIG. 2.

In various implementations in accordance with the present disclosure, medical imaging systems and/or architectures (e.g., the medical imaging system 110 and/or the medical imaging arrangement 100 as a whole) may be configured to support implementing and using super resolution during medical imaging operations (e.g., ultrasound imaging), particularly when using certain types of probes such as electronic 4D (e4D) cardiovascular ultrasound (CVUS) probes. In this regard, in certain types of medical imaging operations, due to operation conditions and/or physical limitation associated with probes or other similar devices used in obtaining data used in generating medical images, the quality of images may be less than optimal. For example, optimal image quality may only be achieved at lower volume rates than what would desirable in at least some actual use scenarios. Electronic 4D (e4D) probes, for example, may typically produce optimal image quality particular volume rates, whereas for certain real-time applications, such as ultrasound guided cardiac interventions, the actual desirable volume rates may be considerably higher. As such, speeding up volume rates may be a critical requirement in some instances. However, such increase in volume rate may result in degradation in quality image, such as due to more sparse transmission and corresponding degradation in quality during construction of images. Accordingly, in various implementations based on the present disclosure, volume rates may be increased without degrading image quality, particularly by use of super resolution based techniques. Example implementations and additional details related thereto are described in more detail below.

Figure 2:
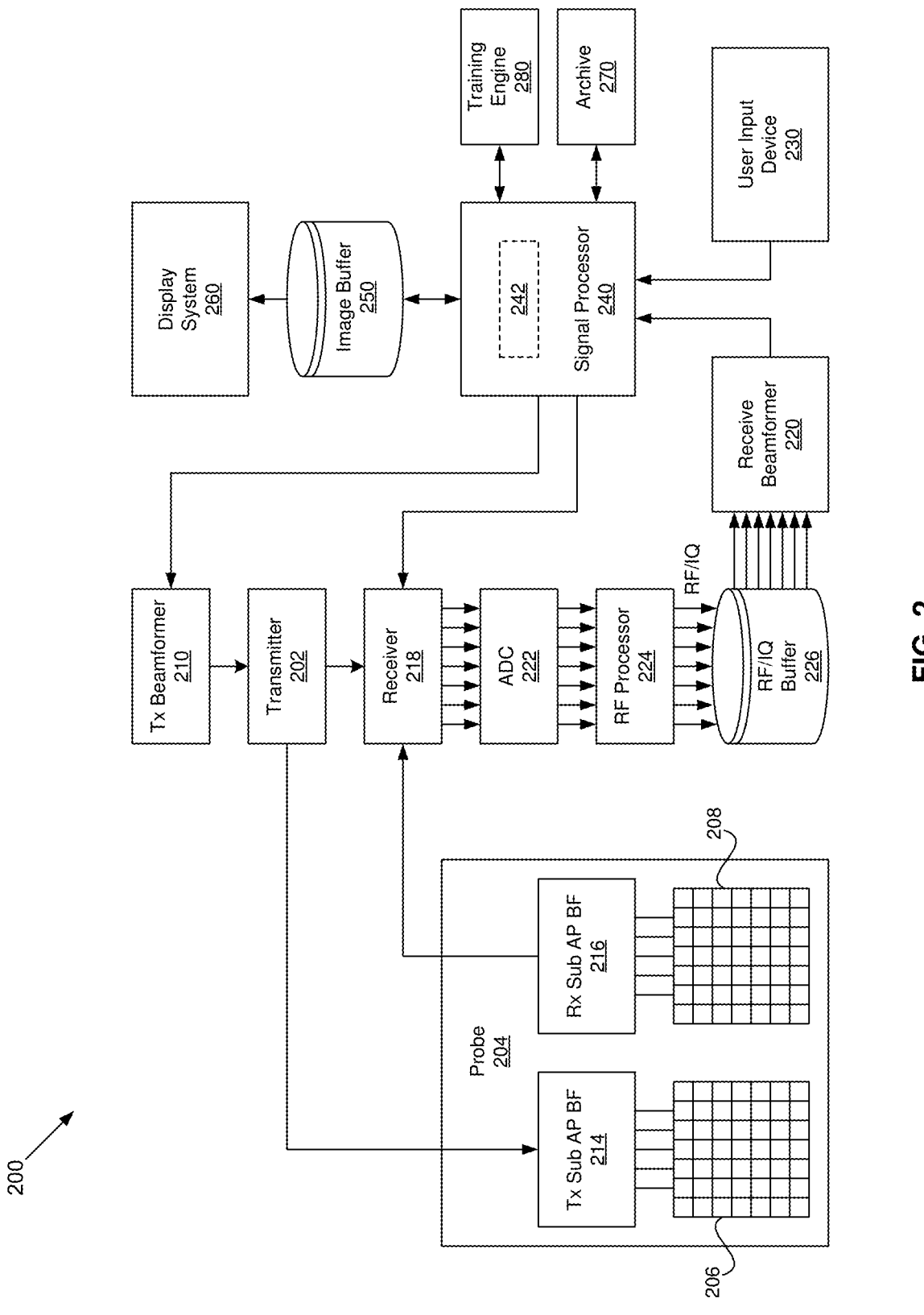
FIG. 2 illustrates an example ultrasound system.

FIG. 2 illustrates an example ultrasound imaging system. Shown in FIG. 2 is an ultrasound imaging system 200, which may be configured to support use of super resolution for electronic 4D (e4D) cardiovascular ultrasound (CVUS) probes in accordance with the present disclosure.

The ultrasound imaging system 200 may be configured for providing ultrasound imaging, and as such may comprise suitable circuitry, interfaces, logic, and/or code for performing and/or supporting ultrasound imaging related functions. The ultrasound imaging system 200 may correspond to the medical imaging system 110 of FIG. 1. The ultrasound imaging system 200 comprises, for example, a transmitter 202, an ultrasound probe 204, a transmit beamformer 210, a receiver 218, a receive beamformer 220, a RF processor 224, a RF/IQ buffer 226, a user input module 230, a signal processor 240, an image buffer 250, a display system 260, an archive 270, and a training engine 280.

The transmitter 202 may comprise suitable circuitry, interfaces, logic, and/or code that may be operable to drive an ultrasound probe 204. The ultrasound probe 204 may comprise a two dimensional (2D) array of piezoelectric elements. The ultrasound probe 204 may comprise a group of transmit transducer elements 206 and a group of receive transducer elements 208, that normally constitute the same elements. In certain embodiment, the ultrasound probe 204 may be operable to acquire ultrasound image data covering at least a substantial portion of an anatomy, such as the heart, a blood vessel, or any suitable anatomical structure.

The transmit beamformer 210 may comprise suitable circuitry, interfaces, logic, and/or code that may be operable to control the transmitter 202 which, through a transmit sub-aperture beamformer 214, drives the group of transmit transducer elements 206 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 208.

The group of receive transducer elements 208 in the ultrasound probe 204 may be operable to convert the received echoes into analog signals, undergo sub-aperture beamforming by a receive sub-aperture beamformer 216 and are then communicated to a receiver 218. The receiver 218 may comprise suitable circuitry, interfaces, logic, and/or code that may be operable to receive the signals from the receive sub-aperture beamformer 216. Nonetheless, the disclosure is not limited to sub-aperture beamforming based implementations, and as such in some implementations transmit sub-aperture beamformer 214 and the receive sub-aperture beamformer 216 may be eliminated and/or replaced by components suitable for other beamforming based designed. The analog signals may be communicated to one or more of the plurality of A/D converters 222.

The plurality of A/D converters 222 may comprise suitable circuitry, interfaces, logic, and/or code that may be operable to convert the analog signals from the receiver 218 to corresponding digital signals. The plurality of A/D converters 222 are disposed between the receiver 218 and the RF processor 224. Notwithstanding, the disclosure is not limited in this regard. Accordingly, in some embodiments, the plurality of A/D converters 222 may be integrated within the receiver 218.

The RF processor 224 may comprise suitable circuitry, interfaces, logic, and/or code that may be operable to demodulate the digital signals output by the plurality of A/D converters 222. In accordance with an embodiment, the RF processor 224 may comprise a complex demodulator (not shown) that is operable to demodulate the digital signals to form I/Q data pairs that are representative of the corresponding echo signals. The RF or I/Q signal data may then be communicated to an RF/IQ buffer 226. The RF/IQ buffer 226 may comprise suitable circuitry, interfaces, logic, and/or code that may be operable to provide temporary storage of the RF or I/Q signal data, which is generated by the RF processor 224.

The receive beamformer 220 may comprise suitable circuitry, interfaces, logic, and/or code that may be operable to perform digital beamforming processing to, for example, sum the delayed channel signals received from RF processor 224 via the RF/IQ buffer 226 and output a beam summed signal. The resulting processed information may be the beam summed signal that is output from the receive beamformer 220 and communicated to the signal processor 240. In accordance with some embodiments, the receiver 218, the plurality of A/D converters 222, the RF processor 224, and the beamformer 220 may be integrated into a single beamformer, which may be digital. In various embodiments, the ultrasound imaging system 200 comprises a plurality of receive beamformers 220.

In accordance with the present disclosure, the beamforming components and/or functions thereof may be configured to enable combining data from several transmit events. This may be done when utilizing certain reconstruction techniques, such as Retrospective Transmit Beamforming (RTB) and/or incoherent Synthetic Transmit Beamforming (iSTB) as described herein with respect to the present disclosure. In this regard, when applying RTB data from several transmit are combined to improve the effective transmit beam before and after the transmit focal range. This may be done to improve resolution and contrast in these regions. The combination of data may be done both on the element data and on summed element data—e.g., the signal after beamforming summation. RTB may be applied in the signal processing block (e.g., with the signal processor 240), or may be at least partly done as part of the receive beamforming processing (e.g., in the receive beamformer 220) and partly in the signal processor 240. For example, RTB based delays and weights may be applied in the receive beamformer 220 whereas the summation of different transmit events may be performed in the signal processor 240. In such split configurations, the receive beamformer 220 may output multiple receive lines for each transmit (e.g., 8 receive lines, such as in the configuration illustrated in and described with respect to FIG. 4), and then the signal processor 240 may sum the receive lines that meet certain criteria—e.g., having identical receive directions (e.g., the upward point (blue) triangles in FIG. 4)—including receive lines that may belong to different transmit events. Similarly, applying iSTB may entail combining data from different transmit events-though this may entail use of fewer events (e.g., only two neighboring events). However, with iSTB the combining is done after detection—e.g., after conversion from RF— or IQ-data to real valued envelope data. Such combining is more likely to happen in the signal processor 240.

The user input device 230 may be utilized to input patient data, scan parameters, settings, select protocols and/or templates, interact with an artificial intelligence segmentation processor to select tracking targets, and the like. In an example embodiment, the user input device 230 may be operable to configure, manage and/or control operation of one or more components and/or modules in the ultrasound imaging system 200. In this regard, the user input device 230 may be operable to configure, manage and/or control operation of the transmitter 202, the ultrasound probe 204, the transmit beamformer 210, the receiver 218, the receive beamformer 220, the RF processor 224, the RF/IQ buffer 226, the user input device 230, the signal processor 240, the image buffer 250, the display system 260, archive 270, and/or the training engine 280.

For example, the user input device 230 may include button(s), rotary encoder(s), a touchscreen, motion tracking, voice recognition, a mouse device, keyboard, camera and/or any other device capable of receiving user directive(s). In certain embodiments, one or more of the user input devices 230 may be integrated into other components, such as the display system 260 or the ultrasound probe 204, for example.

As an example, user input device 230 may include a touchscreen display. As another example, user input device 230 may include an accelerometer, gyroscope, and/or magnetometer attached to and/or integrated with the probe 204 to provide gesture motion recognition of the probe 204, such as to identify one or more probe compressions against a patient body, a pre-defined probe movement or tilt operation, or the like. In some instances, the user input device 230 may include, additionally or alternatively, image analysis processing to identify probe gestures by analyzing acquired image data. In accordance with the present disclosure, the user input and functions related thereto may be configured to support use of new data storage scheme, as described in this disclosure. For example, the user input device 230 may be configured to support receiving user input directed at triggering and managing (where needed) application of separation process, as described herein, and/or to provide or set parameters used in performing such process. Similarly, the user input device 230 may be configured to support receiving user input directed at triggering and managing (where needed) application of the recovery process, as described herein, and/or to provide or set parameters used in performing such process.

The signal processor 240 may comprise suitable circuitry, interfaces, logic, and/or code that may be operable to process ultrasound scan data (i.e., summed IQ signal) for generating ultrasound images for presentation on a display system 260. The signal processor 240 is operable to perform one or more processing operations according to a plurality of selectable ultrasound modalities on the acquired ultrasound scan data. In an example embodiment, the signal processor 240 may be operable to perform display processing and/or control processing, among other things. Acquired ultrasound scan data may be processed in real-time during a scanning session as the echo signals are received. Additionally or alternatively, the ultrasound scan data may be stored temporarily in the RF/IQ buffer 226 during a scanning session and processed in less than real-time in a live or off-line operation. In various embodiments, the processed image data can be presented at the display system 260 and/or may be stored at the archive 270. In accordance with the present disclosure, the signal processor 240 may be configured to support use of reconstruction techniques as described herein. For example, the signal processor 240 may be configured to perform the required receive line and/or event combining or summation as described above when applying RTB or iSTB.

The archive 270 may be a local archive, a Picture Archiving and Communication System (PACS), or any suitable device for storing images and related information, or may be coupled to such device or system for facilitating the storage and/or achieving of the imaging related data. In an example implementation, the archive 270 is further coupled to a remote system such as a radiology department information system, hospital information system, and/or to an internal or external network (not shown) to allow operators at different locations to supply commands and parameters and/or gain access to the image data.

The signal processor 240 may be one or more central processing units, microprocessors, microcontrollers, and/or the like. The signal processor 240 may be an integrated component, or may be distributed across various locations, for example. The signal processor 240 may be configured for receiving input information from the user input device 230 and/or the archive 270, generating an output displayable by the display system 260, and manipulating the output in response to input information from the user input device 230, among other things. The signal processor 240 may be capable of executing any of the method(s) and/or set(s) of instructions discussed herein in accordance with the various embodiments, for example.

The ultrasound imaging system 200 may be operable to continuously acquire ultrasound scan data at a frame rate that is suitable for the imaging situation in question. Typical frame rates range from 20-220 but may be lower or higher. The acquired ultrasound scan data may be displayed on the display system 260 at a display-rate that can be the same as the frame rate, or slower or faster. The image buffer 250 is included for storing processed frames of acquired ultrasound scan data that are not scheduled to be displayed immediately. Preferably, the image buffer 250 is of sufficient capacity to store at least several minutes' worth of frames of ultrasound scan data. The frames of ultrasound scan data are stored in a manner to facilitate retrieval thereof according to its order or time of acquisition. The image buffer 250 may be embodied as any known data storage medium.

In an example embodiment, the signal processor 240 may comprise a super resolution module 242, which comprises suitable circuitry, interfaces, logic, and/or code that may be configured to perform and/or support various functions or operations relating to, or in support of use of super resolution during ultrasound imaging, particularly when using certain types of probes such as electronic 4D (e4D) cardiovascular ultrasound (CVUS) probes, as described in this disclosure.

In some implementations, the signal processor 240 (and/or components thereof, such as the super resolution module 242) may be configured to implement and/or use artificial intelligence and/or machine learning techniques to enhance and/or optimize imaging related functions or operations. For example, the signal processor 240 (and/or components thereof, such as the super resolution module 242) may be configured to implement and/or use deep learning techniques and/or algorithms, such as by use of deep neural networks (e.g., one or more of convolutional neural network (CNN), a generative adversarial network (GAN), residual channel attention network (RCAN), residual dense network (RDN), etc.), and/or may utilize any suitable form of artificial intelligence based processing techniques or machine learning processing functionality (e.g., for image analysis). Such artificial intelligence based image analysis may be configured to, e.g., analyze acquired ultrasound images, such as to identify, segment, label, and track structures (or tissues thereof) meeting particular criteria and/or having particular characteristics.

In an example implementation, the signal processor 240 (and/or components thereof, such as the super resolution module 242) may be provided as deep neural network(s). An example deep neural network may be made up of, e.g., an input layer, an output layer, and one or more hidden layers in between the input and output layers. Each of the layers may be made up of a plurality of processing nodes that may be referred to as neurons.

For example, the deep neural network may include an input layer having a neuron for each pixel or a group of pixels from a scan plane of an anatomical structure, and the output layer may have a neuron corresponding to a plurality of pre-defined structures or types of structures (or tissue(s) therein). Each neuron of each layer may perform a processing function and pass the processed ultrasound image information to one of a plurality of neurons of a downstream layer for further processing. As an example, neurons of a first layer may learn to recognize edges of structure in the ultrasound image data. The neurons of a second layer may learn to recognize shapes based on the detected edges from the first layer. The neurons of a third layer may learn positions of the recognized shapes relative to landmarks in the ultrasound image data. The neurons of a fourth layer may learn characteristics of particular tissue types present in particular structures, etc. Thus, the processing performed by the deep neural network(s) may allow for identifying biological and/or artificial structures in ultrasound image data with a high degree of probability.

In some implementations, the signal processor 240 (and/or components thereof, such as the super resolution module 242) may be configured to perform or otherwise control at least some of the functions performed thereby based on a user instruction via the user input device 230. As an example, a user may provide a voice command, probe gesture, button depression, or the like to issue a particular instruction, such as to initiate and/or control various aspects of the color Doppler improvement function(s), and/or to provide or otherwise specify various parameters or settings relating thereto, as described in this disclosure.

The training engine 280 may comprise suitable circuitry, interfaces, logic, and/or code that may be operable to train the neurons of the deep neural network(s) of the signal processor 240 (and/or components thereof, such as the super resolution module 242). For example, the signal processor 240 may be trained to identify particular structures and/or tissues (or types thereof) provided in an ultrasound scan plane, with the training engine 280 training the deep neural network(s) thereof to perform some of the required functions, such as using databases(s) of classified ultrasound images of various structures.

As an example, the training engine 280 may be configured to utilize ultrasound images to train the signal processor 240 (and/or components thereof, such as the super resolution module 242), such as based on particular structure(s) and/or characteristics thereof, particular tissues and/or characteristics thereof, etc. For example, with the respect to structure(s), the training engine 280 may be configured to identify and utilize such characteristics as appearance of structure edges, appearance of structure shapes based on the edges, positions of the shapes relative to landmarks in the ultrasound image data, and the like. In various embodiments, the databases of training images may be stored in the archive 270 or any suitable data storage medium. In certain embodiments, the training engine 280 and/or training image databases may be external system(s) communicatively coupled via a wired or wireless connection to the ultrasound imaging system 200.

In operation, the ultrasound imaging system 200 may be used in generating ultrasonic images, including two-dimensional (2D), three-dimensional (3D), and/or four-dimensional (4D) images. In this regard, the ultrasound imaging system 200 may be operable to continuously acquire ultrasound scan data at a particular frame rate, which may be suitable for the imaging situation in question. For example, frame rates may range from 30-70 but may be lower or higher. The acquired ultrasound scan data may be displayed on the display system 260 at a display-rate that can be the same as the frame rate, or slower or faster. An image buffer 250 is included for storing processed frames of acquired ultrasound scan data not scheduled to be displayed imme-
diately. Preferably, the image buffer 250 is of sufficient
capacity to store at least several seconds' worth of frames of
ultrasound scan data. The frames of ultrasound scan data are
stored in a manner to facilitate retrieval thereof according to
its order or time of acquisition. The image buffer 250 may
be embodied as any known data storage medium.

In some instances, the ultrasound imaging system 200
may be configured to support grayscale and color based
operations. For example, the signal processor 240 may be
operable to perform grayscale B-mode processing and/or
color processing. The grayscale B-mode processing may
comprise processing B-mode RF signal data or IQ data pairs.
For example, the grayscale B-mode processing may enable
forming an envelope of the beam-summed receive signal by
computing the quantity $(I^2+Q^2)^{1/2}$. The envelope can
undergo additional B-mode processing, such as logarithmic
compression to form the display data.

The display data may be converted to X-Y format for
video display. The scan-converted frames can be mapped to
grayscale for display. The B-mode frames that are provided
to the image buffer 250 and/or the display system 260. The
color processing may comprise processing color based RF
signal data or IQ data pairs to form frames to overlay on
B-mode frames that are provided to the image buffer 250
and/or the display system 260. The grayscale and/or color
processing may be adaptively adjusted based on user
input—e.g., a selection from the user input device 230, for
example, for enhance of grayscale and/or color of particular
area.

In some instances, ultrasound imaging may include gen-
eration and/or display of volumetric ultrasound images—
that is where objects (e.g., organs, tissues, etc.) are displayed
three-dimensional 3D. In this regard, with 3D (and similarly
4D) imaging, volumetric ultrasound datasets may be
acquired, comprising voxels that correspond to the imaged
objects. This may be done, e.g., by transmitting the sound
waves at different angles rather than simply transmitting
them in one direction (e.g., straight down), and then capture
their reflections back. The returning echoes (of transmis-
sions at different angles) are then captured, and processed
(e.g., via the signal processor 240) to generate the corre-
sponding volumetric datasets, which may in turn be used in
creating and/or displaying volume (e.g. 3D) images, such as
via the display 250. This may entail use of particular
handling techniques to provide the desired 3D perception.

For example, volume rendering techniques may be used
in displaying projections (e.g., 3D projections) of the volu-
metric (e.g., 3D) datasets. In this regard, rendering a 3D
projection of a 3D dataset may comprise setting or defining
a perception angle in space relative to the object being
displayed, and then defining or computing necessary infor-
mation (e.g., opacity and color) for every voxel in the
dataset. This may be done, for example, using suitable
transfer functions for defining RGBA (red, green, blue, and
alpha) value for every voxel.

In various implementations in accordance with the present
disclosure, ultrasound imaging systems (e.g., the ultrasound
imaging system 200) may be configured to support imple-
menting and using super resolution during ultrasound imag-
ing, particularly when using certain types of probes such as
electronic 4D (e4D) cardiovascular ultrasound (CVUS)
probes. In this regard, as noted above, in certain types of
medical imaging operations, due to operation conditions
and/or physical limitation associated with probes or other
similar devices used in obtaining data used in generating
medical images, the quality of images may be less than optimal. For example, electronic 4D (e4D) probes may
typically produce optimal image quality at lower volume
rates, such as 5-8 vol/s (vps), whereas for certain real-time
applications, such as ultrasound guided cardiac interven-
tions, the actual desirable volume rates may be as high as 30
vol/s (vps). As such, speeding up volume rates (e.g., mini-
mum speed up of 2× to 3× in volume rate increase) may be
a critical requirement in some instances. Increasing volume
rates may be done by reducing number of transmissions.
However, such increase in volume rate may result in deg-
radation in quality image due to the more sparse transmis-
sion and corresponding degradation in quality during con-
struction of images.

Implementations based on the present disclosure may
address these issues by allowing for increasing volume rates
may be increased without degrading image quality, particu-
larly by use of super resolution based techniques. In par-
ticular, in various example implementations deep learning-
based image super resolution techniques may be used to
improve the volume rates by 2× and 3× for e4D probes (e.g.,
from the baseline 5 vol/s (vps) acquisition) while maintain-
ing optimal image quality—e.g., keeping the image quality
at diagnostic levels. Nonetheless, the disclosure is not lim-
ited to e4D probes, and similar techniques as described
herein may be used for other types of probes. For example,
in some implementations, image super resolution for single
line acquisitions may be used to gain upsampling (e.g., gain
4× upsampling). Use of such single line acquisitions may be
particularly suitable for mechanical 3D probes. Example
implementations and additional details related thereto are
described in more detail below In various example implementations, a deep learning
(DL) based processing (e.g., using suitable architecture)
may be used to reconstruct ultrasound images from sparse
transmits. In this regard, a framework for super resolution
under varying combination of reconstruction methods and
acquisition configuration may be used. In some example
implementations, a deep learning based processing (e.g.,
using suitable architecture) to reconstruct Retrospective
Transmit Beamforming (RTB) equivalent ultrasound images
from images generated using Incoherent reconstruction
methods. In some example implementations, a deep learning
based processing (e.g., using suitable architecture) to recon-
struct RTB equivalent ultrasound images from images gen-
erated using single line acquisitions. Nonetheless, the dis-
closure is not limited to use of RTB based implementations,
and proposed solutions based on the disclosure may be
substantially similarly used to reproduce any advanced
reconstruction from an image generated using a less
advanced reconstruction. Such image super resolution may
be used for ultrasound acquisitions that are typically aniso-
tropic. The super resolution may be lateral but not in depth
compared to other medical imaging acquisitions or natural
images.

Solutions based on the present disclosure may be particu-
larly configured for e4D probes (e.g., Cardiac 4Vc), par-
ticularly for use in elevation directions, but similarly solu-
tions may be used with other probes. In some example
implementations, deep learning (DL) based super resolution
may be used to provide, e.g., 2×/3×/4× super resolution, 18
Tx/12 Tx/9 Tx incoherent Synthetic Transmit Beamforming
(iSTB) to 36 Tx RTB.

In some example implementations, a multi-stage formu-
lation (and architectures based thereon) may be used to
address the different aspects of super resolution. In this
regard, artifact suppression caused by reduced transmits
may be addressed in one stage, such as with deep learning (DL) and non-DL methods. Other artifact corrections, such as signal-to-noise ratio (SNR) and contrast resolution improvement, may be addressed in another stage, such as to mimic images generated with better reconstruction methods.

In some example implementations, a combination and training strategy with two loss functions may be used. In this regard, using combination of pixel wise reconstruction losses and perceptual losses for ultrasound reconstructions may yield a realistic ultrasound looking texture. In one example implementation, a combination of mean absolute error (MAE) and structural index similarity (SSIM) may be used.

In some example implementations, training data that may be used in training AI based functionality may be generated using acquired medical imaging data. The generating and/or use of such training data may be done in the training engine 280, for example. In this regard, generating effective training data sets may be key for enabling successful training of AI networks. Such training data may comprise datasets of both compromised and high-quality datasets generated from the same clinical data. This may be done by, e.g., dumping channel data recordings from each transducer element and each transmit beam individually and performing all the system side processing offline in two different ways: one with decimated number of transmit events and incoherent processing and another with coherent processing and fully dense transmit grid, which makes it possible to provide an AI network with clinical data of both a compromised and a ground truth quality.

In some example implementations, transmit related configuration parameters or characteristics may be adaptively selected or adjusted for use in combination with the reconstruction methods used. In an example implementation, choice of aperture (e.g., type of and/or value from range of available aperture values) may be done, such as based on beam spacing artifacts that are introduced due to the selected aperture. In some instances, choice of the processing methodology and the DL model learning procedures may vary based on the aperture used. In this regard, small aperture datasets may typically require the model to learn resolution enhancement in addition to improving contrast resolution, while larger aperture acquisitions may have better resolution but introduce artifacts.

Figure 3:
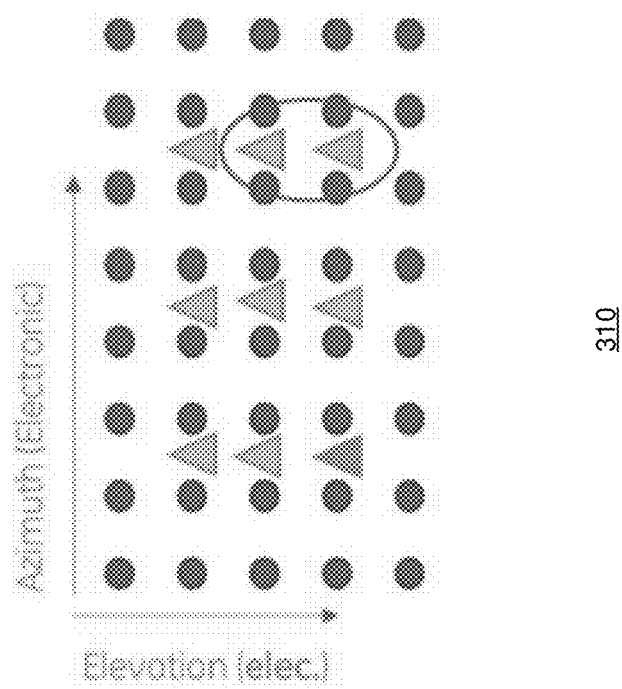
FIG. 3 illustrates an example volume acquisition when using an electronic 4D (e4D) probe.
Figure 3:
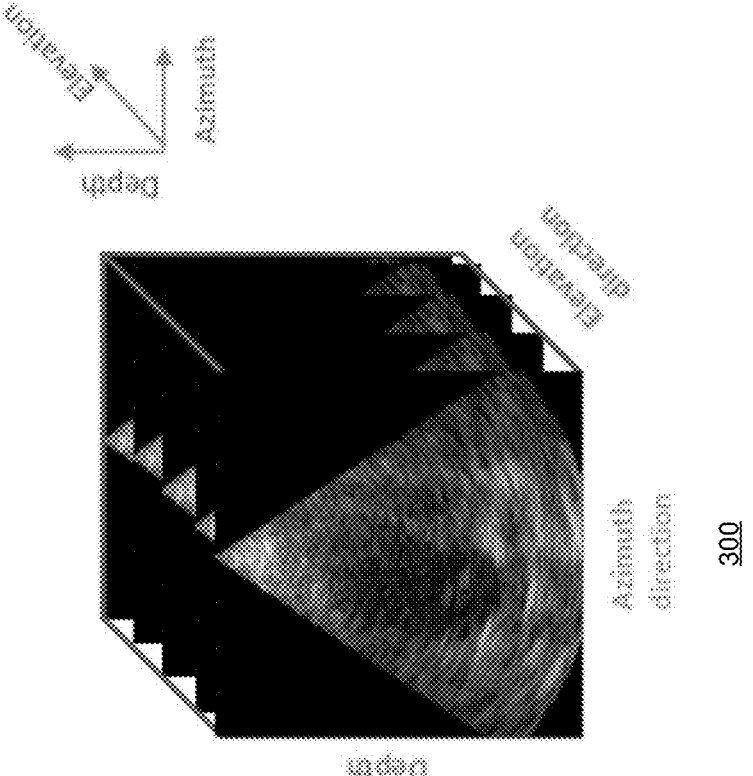

FIG. 3 illustrates an example volume acquisition when using an electronic 4D (e4D) probe. Shown in FIG. 3 is a volume 300 generated using an electronic 4D (e4D) probe.

The volume 300 may be generated in a medical imaging system (e.g., the ultrasound system 200 of FIG. 2) by use of raster scanning, electronically steered 4D probe. In particular, illustrated in FIG. 3 how a single volume—that is, volume 300—is built up by plane by plane (or image by image) with the elevation angle incremented for each plane. The planes or images corresponding to the volume 300 may vary from one to the next with respect to one or more of the three directions: depth direction, azimuth direction, and elevation direction, as illustrated in FIG. 3. There may be, however, certain technical challenges that arise with use of such e4D probes, particularly in use cases requiring higher volume rates as described above.

One of these technical challenge is the choice of beamforming methods. For example, in some instance Retrospective Transmit Beamforming (RTB) may be used in the azimuth direction and incoherent Synthetic Transmit Beamforming (iSTB) in the elevation direction. However, the choice of reconstruction method in elevation direction leads to reduced image quality in elevation. In this regard, transmit firing pattern in e4D probes happen in a raster mode. An example transmit pattern is illustrated in chart 310, where triangles indicate transmit locations and the circles indicate receive line locations. As illustrated chart 310, with raster mode operation there is typically multiples receive lines for each transmission. This may lead to large time spacing between successive transmits in elevation (e.g., the two circled transmits). Such time difference may pose certain challenges with respect to the generating of images—e.g., posing a challenge to use of coherent reconstruction techniques in the elevation direction. Thus incoherent STB is utilized in elevation direction (with no phase addition), whereas RTB is used in azimuth direction.

Another technical challenge with use of e4D probes is the configuring of transmission function(s). In this regard, the configuring of transmission functions has direct effects on the volume rates. In particular, the volume rate may be determined using the following equations:

$$\text{Time for single transmit event in ultrasound acquisitions: } Tsl = \frac{2R}{c}$$

$$\text{Time for single volume: } Tv = Tsl \times N_{elevation} \times N_{azimuth}$$

$$\text{Volume rate: } vps = \frac{1}{Tv}$$

where R is depth, c is speed of sound, $N_{elevation}$ is number of transmits in the elevation direction, and $N_{azimuth}$ is number of transmits in the azimuth.

For example, with R set to 15 cm and c set as 1540 m/s, an optimal image quality may be achieved with 30-36 transmits in azimuth and elevation for a volume rate of 3-5 vol/s (vps). To achieve a higher volume rate of, e.g., 10-15 vol/s (vps), the number of transmits in one or both directions may have to be reduced (e.g., by half). As illustrated in the example data in table 1 below, by adjusting the number of transmits in one or both of the elevation direction and the azimuth direction, the volume rate may be adjusted-particularly increased:

TABLE 1

| effects of transmit number adjustments on volume rate | | | |
|---|---|---|---|
| $N_{elevation}$ | $N_{azimuth}$ | Volume Rate (vps) | Outcome |
| 36 | 36 | 5 | Optimal image quality with low vps |
| 18 | 36 | 10 | 2x gain in volume rate |
| 12 | 36 | 15 | 3x gain in volume rate |
| 9 | 36 | 20 | 4x gain in volume rate |
| 18 | 18 | 20 | 4x gain in volume rate |

Thus, the volume rate may be modified by adjusting the number of transmits. In this regard, the number of transmits in a typical 2D scan can go much higher than e4D probes. For example, while number of transmits in a typical 2D may go as high as 92 transmits with RTB, in e4D probes, the number of transmits in azimuth are on the lower side, such as ~36 transmits. The number of transmits in elevation direction may be significantly compromised if higher volume rate setting is chosen. When this is combined with inferior beamforming/reconstruction method in the elevation direction, this may result in a poorer image quality. Accordingly, additional measures need to be used to enhance image quality. For example, super resolution based solutions may be used to account for and mitigate the effects of reducing number of transmits.

Figure 4:
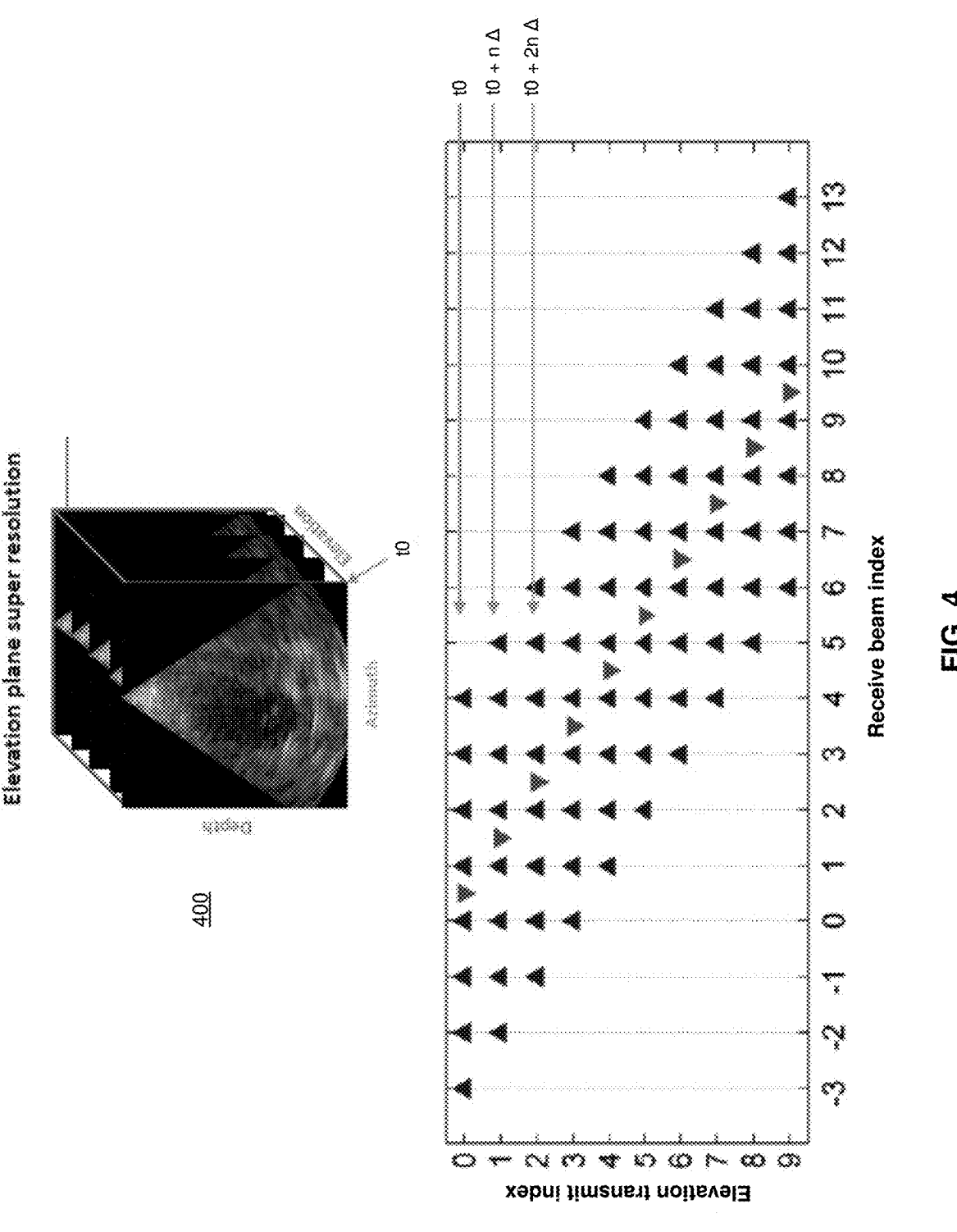
FIG. 4 illustrates the time delay in elevation direction during medical 4D imaging operations.

FIG. 4 illustrates the time delay in elevation direction during medical 4D imaging operations. Shown in FIG. 4 is a volume 400 generated using an electronic 4D (e4D) probe.

The volume 400 may be generated in a medical imaging system (e.g., the ultrasound system 200 of FIG. 2) by use of raster scanning, electronically steered 4D probe. In particular, illustrated in FIG. 4 how a single volume—that is, volume 400—is built up by plane by plane (or image by image) with the elevation angle incremented for each plane. Also shown in FIG. 4 is chart 410 illustrating elevation grid index corresponding to the volume 400. As illustrated chart 410, with raster scan mode operation there may be large time spacing between successive transmits in the elevation direction. In this regard, as shown in chart 410, t0 is the time for the initial transmit event—that is for transmit index 0, $\Delta$ is the time taken for one transmit-receive event, and n is number of transmit events in azimuth direction—that is, the $N_{azimuth}$ as described above. With the data collection happening in the azimuth direction, it may be assumed that for 2 successive transmits, the time $\Delta$ may not be significant enough to introduce any motion causing artifacts. However, large time difference between successive transmit events in elevation plane may prohibit using coherent addition and RTB.

Figure 5:
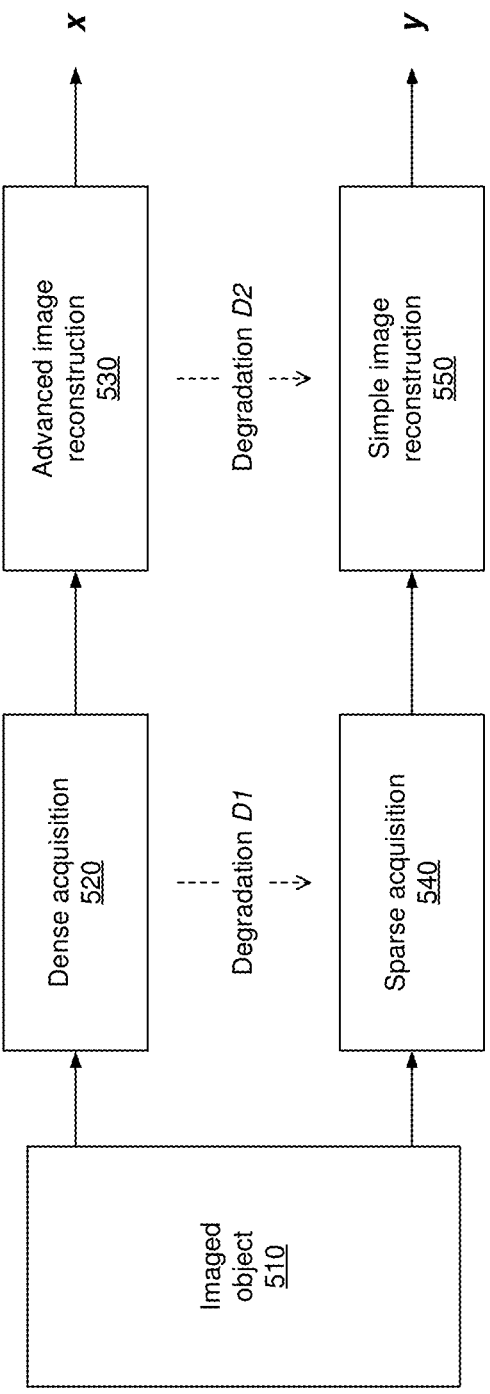
FIG. 5 illustrated example functional flow chart for generating input and target frames for the super resolution method, with different degradation mechanisms that may be introduced in the flow.

FIG. 5 illustrated example functional flow chart for generating input and target frames for the super resolution method, with different degradation mechanisms that may be introduced in the flow. Shown in FIG. 5 is functional flow chart 500 for generating target frames. In this regard, ideal target frames x, corresponding to an imaged object 510, may be generated using dense acquisition 520 and with a corresponding advance image reconstruction 530. However, due to practical considerations, as described above, it may be necessary to use sparse acquisition 540—that is, reduce number of transmits—with a corresponding simple image reconstruction 550—that is, with inferior reconstruction method compared to the method used in the advance image reconstruction 530—resulting in frames y instead. The y frames may be degraded in comparison to the ideal frames x, however. In this regard, there may be two main sources of degradation: degradation due to sparsity in transmits (D1) and degradation due to choice of beamforming and signal processing method (D2). In particular, D1 degradation corresponds to missing data (resulting in structure artifacts) whereas D2 degradation corresponds to use of inferior quality reconstruction methodology (resulting in loss of contrast and/or sharpness in the images). Thus, y may be expressed as y=(D2 o D1) x.

Accordingly, the ideal frames x (or approximation thereof) may be generated from the y frames (or data corresponding thereto) by modeling by the degradation(s) of the non-ideal path—that is modeling of D1 and D2. For example, deep learning models may be used, with these models being configured, implemented, and/or adjusted to enable learning x given y. However, degradations may be complex to mathematically model. Further, the modeling may be configurable based on the type of probe used, use case conditions, etc. For example, the problem space for electronic 4D (e4D) probes may include accounting for and/or addressing D1 degradation (e.g., sparse to dense transmissions), accounting for and/or addressing D2 degradation (e.g., modeling from iSTB to RTB), with the problem being elevation direction super resolution. As such, with the e4D probes, elevation direction has to be reconstructed with iSTB but with fewer or varying degree of transmits. The problem space for mechanical 3D probes may include accounting for and/or addressing D1 degradation (e.g., sparse to dense transmissions), accounting for and/or addressing D2 degradation (e.g., modeling Single Line Acquisition (SLA) to RTB), with the problem being elevation direction. As such, with the mechanical 3D probes, the focus is single line acquisition, with no software beamforming method used.

Figure 6:
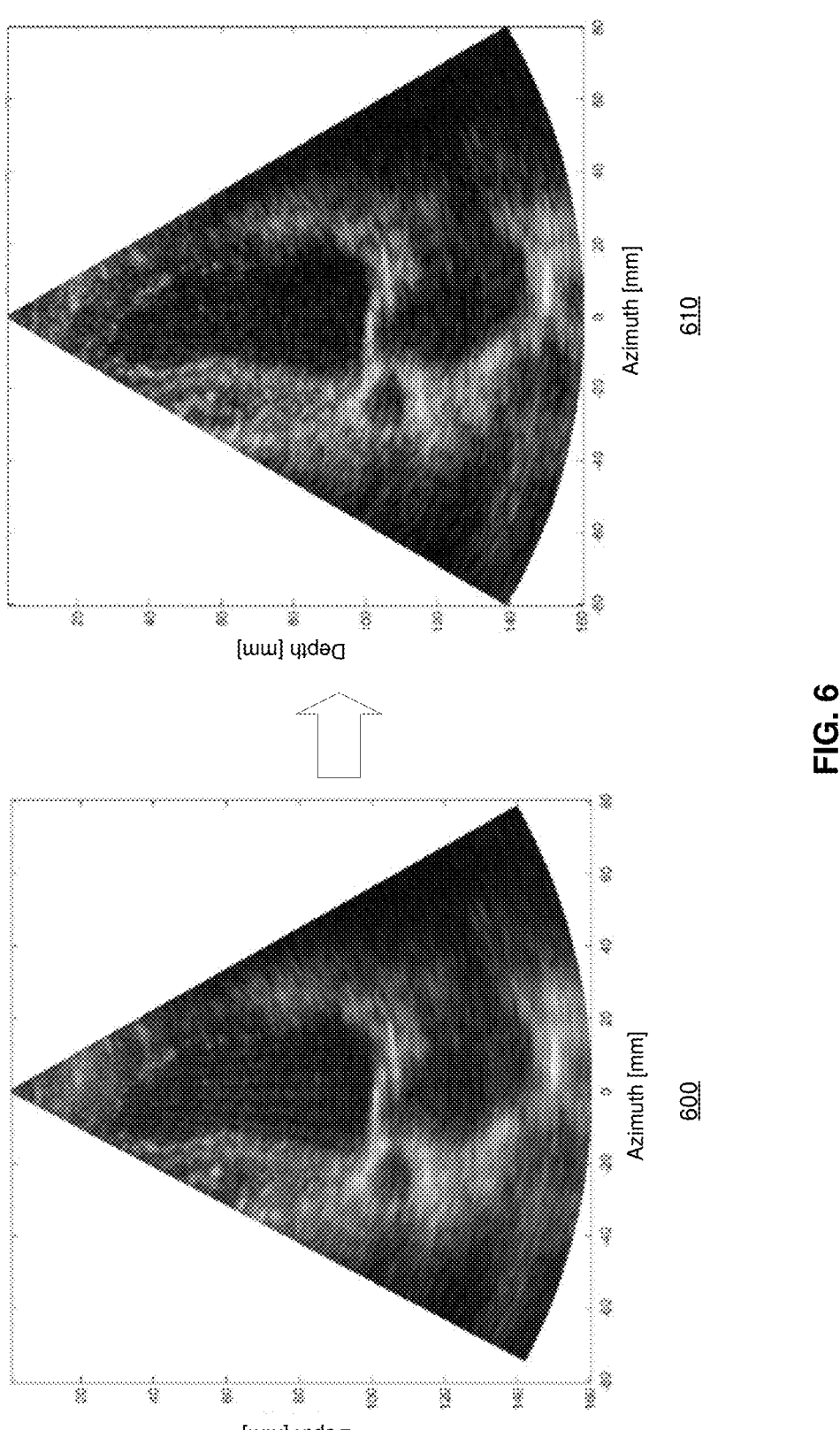
FIG. 6 illustrates images for demonstrating effects of use of reduced number of transmits and inferior reconstruction method.

FIG. 6 illustrates images for demonstrating effects of use of reduced number of transmits and inferior reconstruction method. Shown in FIG. 6 are images 600 and 610.

The training data for such an AI super resolution network may be generated by processing the same ultrasound signals recorded from individual transducer element (channel data) during individual transmit beam emissions. Such processing may be performed offline. The raw data may be recorded while the probe is used in a clinical setting in a large number of exams and the processing may be performed twice on the same data, one pass using an inferior reconstruction method reminiscent of, e.g., the elevation dimension in 3D, such as using incoherent STB, and the other method using a coherent high precision reconstruction method like RTB. Moreover, the former reconstruction method may use a decimated number of transmit events in order to emulate a high framerate sparse grid reminiscent of for instance a fast 3D recording. The processing may be set up to replicate completely the scanner software beamforming and processing chain in order to produce a compromised and high quality output image as it would appear in the processing chain of the scanner in real-time. These duplicate image sets may then be employed as corresponding ground truth and input data for training the network. This training will enable the network to infer high quality images from compromised high framerate images real-time on the scanner. For example, the image 600 may be generated with the reduced number of transmits (e.g., 2x-x decimation in transmits) compared to image 610. Further, the image 600 may be generated using inferior reconstruction method compared to the reconstruction method used for the image 610—e.g., with the image 600 constructed using iSTB whereas image 610 is constructed using RTB. As illustrated by images 600 and 610, the decimation in transmit and the use of the inferior reconstruction method (iSTB rather than RTB) result in reduced image quality—e.g., drop in signal-to-noise ratio (SNR), loss of contrast, etc. In the real-time case applicable to such a trained model, as explained volume rate is inversely proportional to the number of transmits, and as such increasing volume rate, where that may be desired, may be done by reduction in transmits/number of transmits. Such reduction, however, especially when combined with use with inferior reconstruction method may result in degraded image quality, as illustrated by the quality of image 600 compared to image 610. In this regard, using the high volume rate typically used in e4D probes (e.g., 20-30 vps) would otherwise result in an image similar to image 600. These issues and/or defects may be worsened by use of certain transmission configurations. For example, use of large transmit aperture may cause requirements of even denser transmit beam spacing to avoid beam spacing artifacts, severity of which may increase for larger scan angle depth.

Accordingly, in implementations based on the present disclosure, corrections may be applied to data obtained during the imaging operation, which would otherwise result in images similar to image 600, to produced images with quality similar to that of image 610. Such corrections may be performed using advanced processing techniques, such as AI-based processing, to allow for addressing the artifacts caused by use of the higher volume rate. In particular, a network trained on the data sets generated as described above may be able to infer the high quality data similar to image 610 when exposed to images similar to image 600.

FIGS. 7A-7D illustrate effects of sparse and dense transmissions and aperture configuration during medical imaging operations.

Figure 7A:
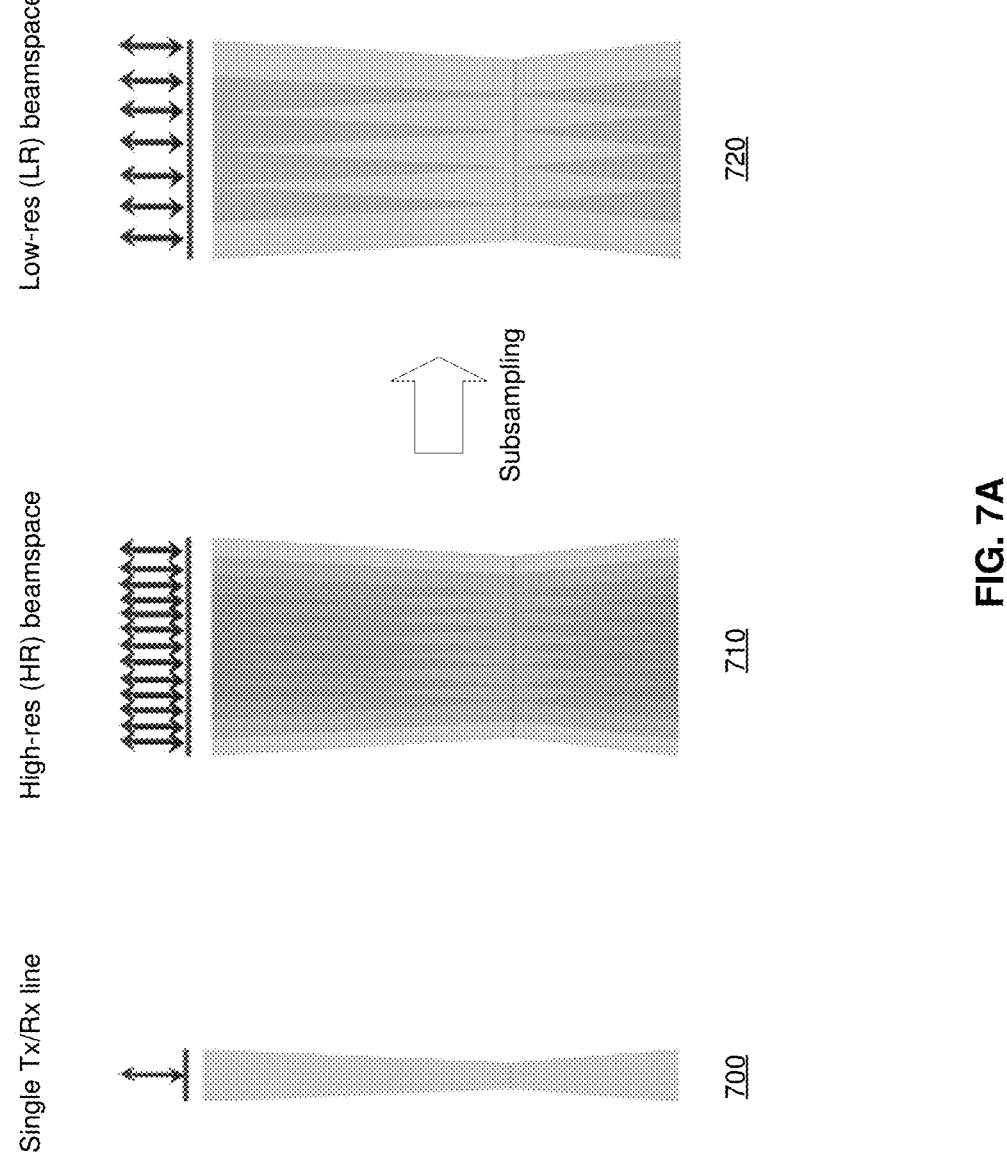
FIGS. 7A-7D illustrate effects of sparse and dense transmissions and aperture configuration during medical imaging operations.

In this regard, shown in FIG. 7A are single Tx/Rx line beam 700, high-resolution (HR) beamspace 710, and low-resolution (LR) beamspace 720. In this regard, the single Tx/Rx line beam 700 correspond to use of a single transmit/receive line whereas the high-resolution (HR) beamspace 710 and the low-resolution (LR) beamspace 720 correspond to use of multiple transmit/receive lines, with the high-resolution (HR) beamspace 710 having more lines for the same space—that is, higher line density. The selection of the type of beam (or beamspace) may be based on operation requirement—e.g., ensuring that sufficient number of lines are used to get full spatial coverage.

Figure 7B:
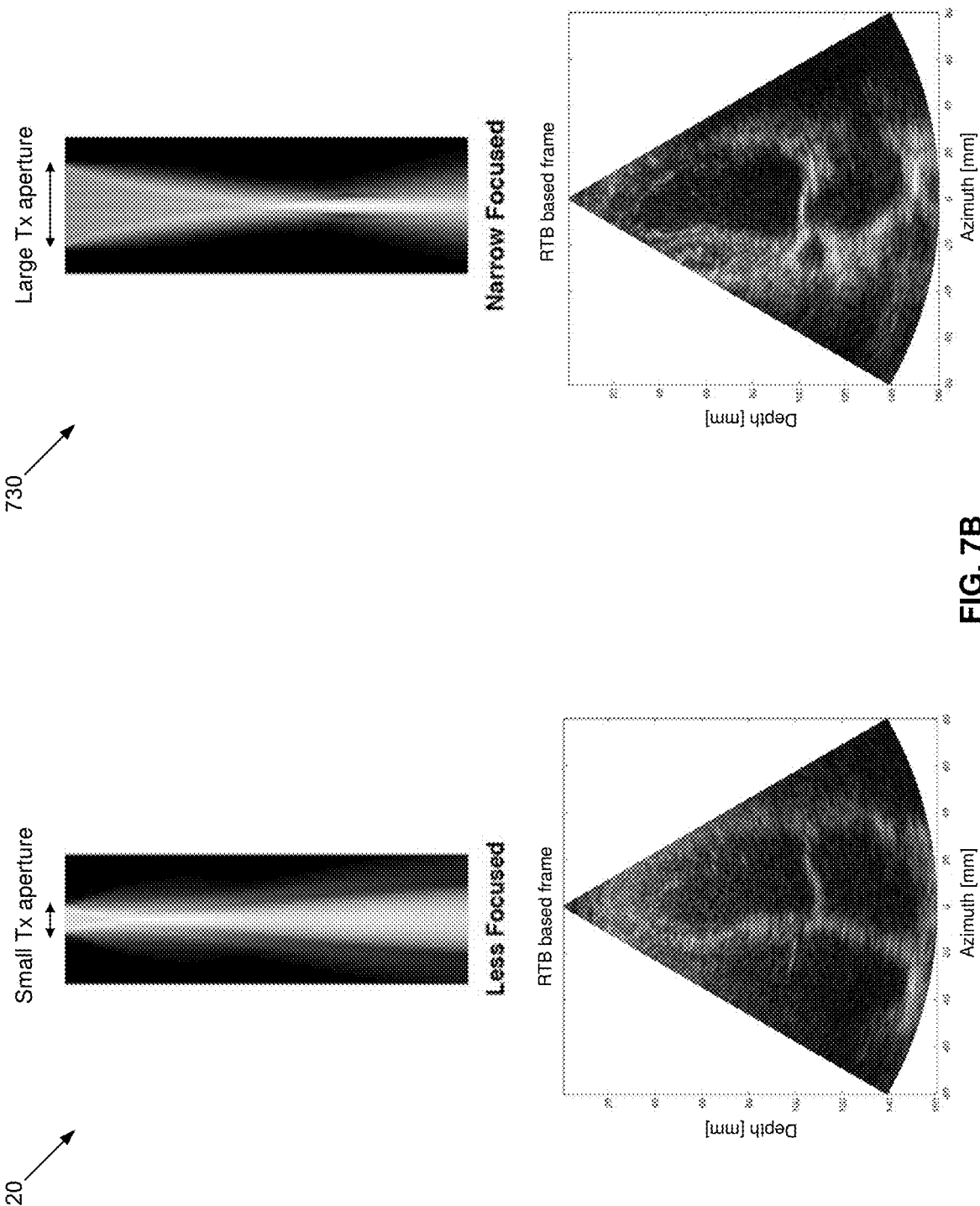

Another design or configuration consideration is aperture and choice thereof. Shown in FIG. 7B are an example small transmit (Tx) aperture 720, along with an example image generated based on used thereof, and an example large transmit (Tx) aperture 730, along with an example image generated based on used thereof. In this regard, as illustrated in FIG. 7B, use of small aperture may result in larger overlap and unfocused (or less focused) beams, with poor lateral resolution and contrast resolution, whereas use of large aperture may result in narrow beams, with better lateral resolution and contrast. However, there may be other considerations pertinent to the selection of aperture, such as beam spacing—that is, the distance(s) between the beams. For example, use of large aperture also increases the requirements on beam spacing. In this regard, use of large aperture may result in higher beam spacing due to the narrow beams. Such high beam spacing may cause some issues, however, as it may result in beam spacing artifacts at half transmit, and loss of contrast and SNR if the beam spacing is not sufficiently dense. As such, use of large aperture may necessitate decreasing beam spacing—that is, to make beam spacing smaller—to avoid or reduce holes. Decreasing beam spacing may not be possible, however. As such, performance may vary and may have to be assessed based on the aperture and choice thereof both in terms of artifacts and image quality. This may be particularly relevant when reducing number of transmits (e.g., to decrease beam density), which may necessitate considering use of smaller aperture to make the beams wider and thus properly cover the imaged object with the transmit beams.

Figure 7C:
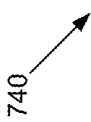
Figure 7C:
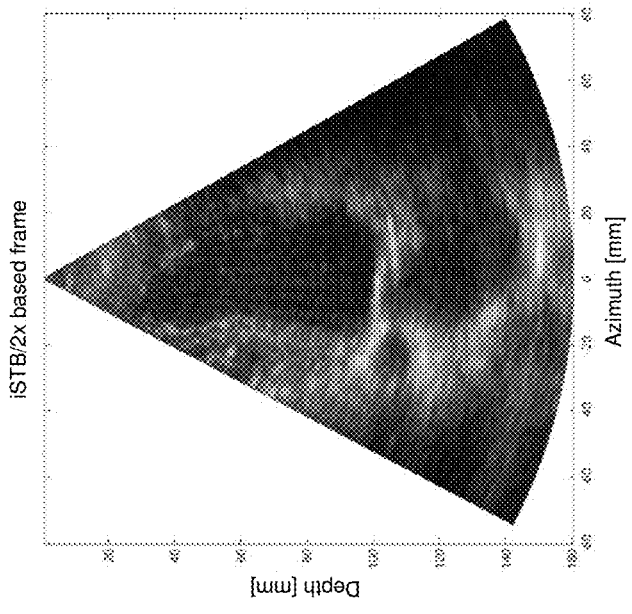
Figure 7C:
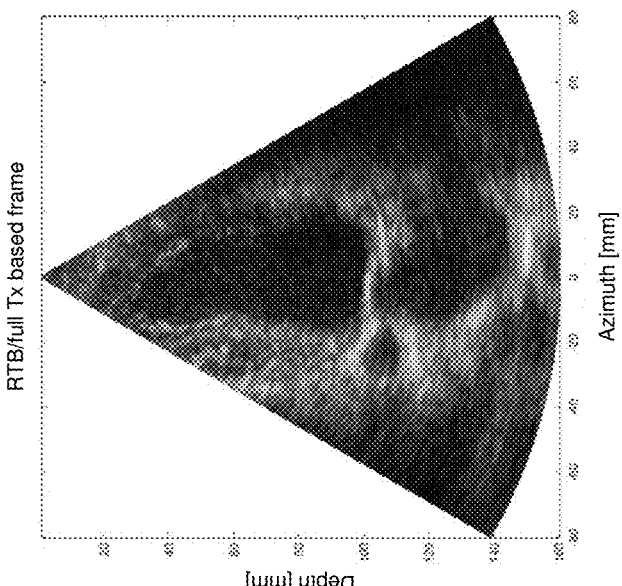
Figure 7C:
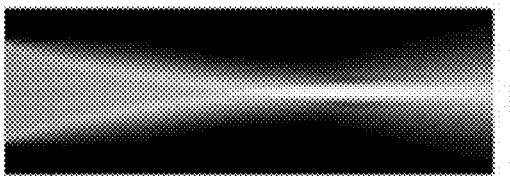
Figure 7D:
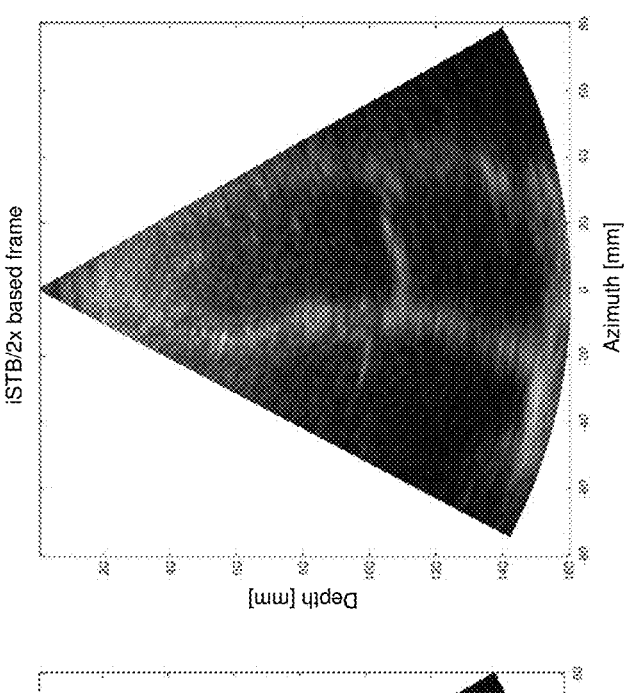
Figure 7D:
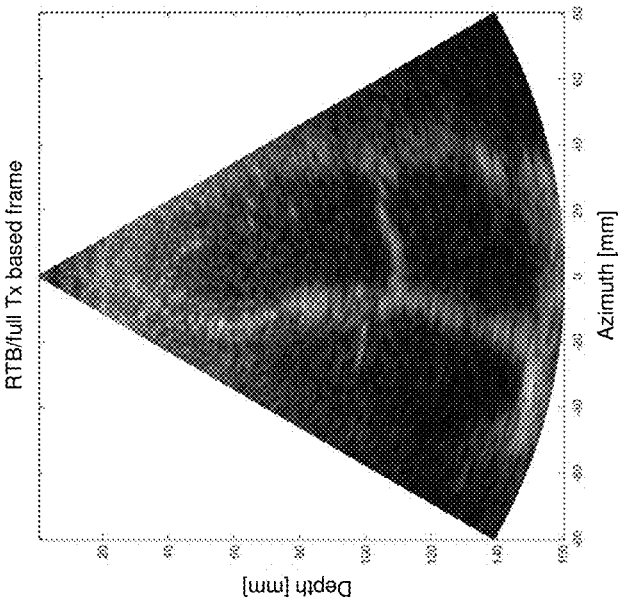
Figure 7D:
Figure 7D:
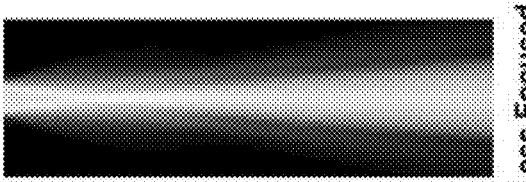

FIGS. 7C and 7D illustrated the combined effects of aperture choice and reconstruction method. In this regard, illustrated in FIG. 7C is an example use case 740 depicting results of use of large Tx aperture (thus narrow and focused beams) in combination with full data—that is RTB/full Tx based frame, and in combination with sparse data—that is, iSTB/2x based frame. Illustrated in FIG. 7D is an example use case 750 depicting results of use of small Tx aperture (thus less focused beam) in combination with full data—that is RTB/full Tx based frame, and in combination with sparse data—that is, iSTB/2x based frame. As shown in FIGS. 7C and 7D, even with the better reconstruction method(s), use of small aperture will result in reduced image quality, even though it provide larger spatial coverage.

Figure 8:
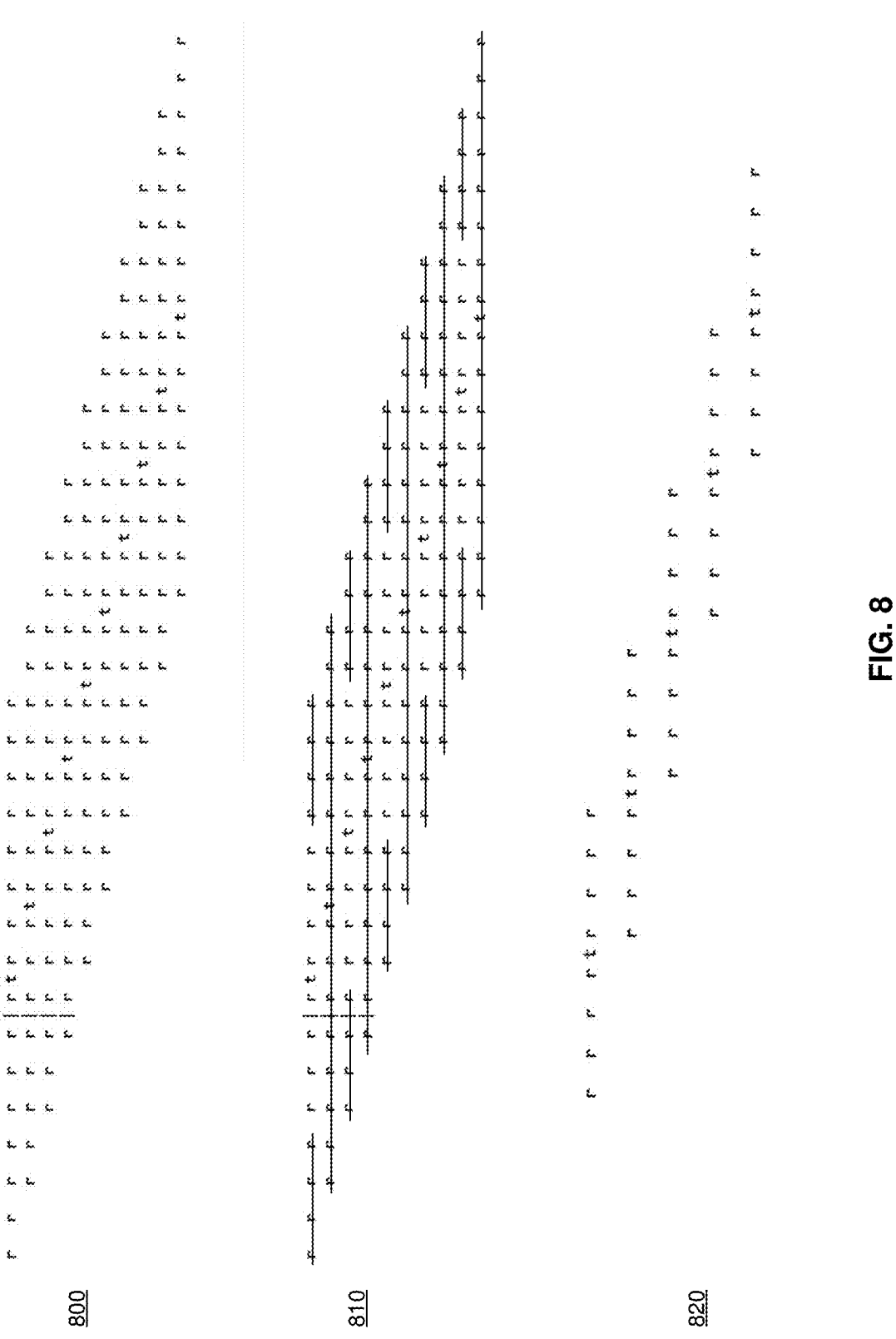
FIG. 8 illustrates how a high beam density, advanced reconstruction setup is decimated to generate training data for an elevation super resolution artificial intelligence (AI) based network.

FIG. 8 illustrates example 2D acquisition schemes both for recording and for emulating data structures that can be used for training and use of an elevation super resolution artificial intelligence (AI) based network. Shown in FIG. 8 are data structure 800, data structure 810, and data structure 820.

In this regard, FIG. 8 illustrates use of 2D acquisition that may be done to generate training data for an AI network, which may then be operated on planes in either azimuth direction or elevation direction in an actual 3D recording. Use of 2D based training may be preferable because the alternative would be to record and use 3D data for training such AI network. However, use of 3D data may be undesirable. For example, use of 3D data may be hard to achieve with RTB based reconstruction since RTB processing cannot be done in the elevation direction of a 3D recording due to the long time span between acquired planes. As shown in FIG. 8, the data structures illustrated in FIG. 8 represent the transmit and receive beam directions (e.g., based on the acquisition scheme) for different sparsity and reconstruction methods. The data structure 800 corresponds to acquisition scheme for the full density data that is actually recorded whereas the data structure 810 corresponds to removing of certain transmits and receives from that fully recorded full density data in post processing, to emulate transmit decimation and also to emulate a less advanced reconstruction method (e.g., use of iSTB). Accordingly, as illustrated in data structure 810, removing some transmits corresponds to the D1 degradation, whereas removing the outer receives corresponds to creating the acquisition scheme for the inferior iSTB processing (relative to the superior RTB processing). Thus, the data structure 810 and the data structure 800 may both be generated from the same recorded channel data sets by virtue of alternative offline reconstruction schemes, whereas data structure 820 represents a real-time data acquisition scheme constituting images the network may be exposed to, inferring from it an image quality reminiscent of the data generated in the data structure 800. In particular, the data structure 800 represents full recorded (dense) data that may be used with optimal reconstruction. In this regard, data based on the data structure 800 may be recorded with, e.g., 2RTB construction (beamformer reconstructing 2 imaging lines for each transmit event) and 16 MLA (1 transmit-16 receive arrangement), with the resultant data structure processed coherently. Data for the data structure 810 may be generated using the data recorded based on the data structure 800, which is then subjected 2× decimation, with only 2 overlapping lines to add. These lines are eventually added incoherently. Data based on the data structure 820 may be recorded/processed as 8MLA (1 transmit-8 receive), 4 incoherent STB, with 2× less transmit beams—that is, data structure 820 represent 4iSTB2× data, where 2× stands for 2 times decimated transmit beams.

As illustrated in FIG. 8, the data structure 810 effectively has the same structure as the data structure 820. The data structure 800 essentially constitute the ground 'truth' data—that is, the data that allow generating ideal images, with the system needing to be trained to go from the data structure 820 to the data structure 800, such as by inference. In other words, in various implementations the D1 degradation correction, to correct structured artifacts, may be achieved by training the system generated from data (structures) similar to the data structure 820, which is would actually be generated, to data (structures) similar to the data structure 800, which corresponds to what would have been captured using dense transmission and processed using RTB reconstruction. Thus, with reference to the data structure illustrated in FIG. 8, data structure 810 is emulated from data structure 800, with the emulation introducing both D1 degradation and D2 degradation. The D1 degradation is introduced by removing entire transmits from the acquired dataset using 800 acquisition scheme, and D2 degradation (or at least it creates an acquisition scheme intended for processing causing D2 degradation) is introduced by removing receive beam data from the data structure 800. The D2 degradation is completed later in the processing by combining the overlapping receive beams incoherently instead of coherently as would be the case in RTB based applications.

Figure 9:
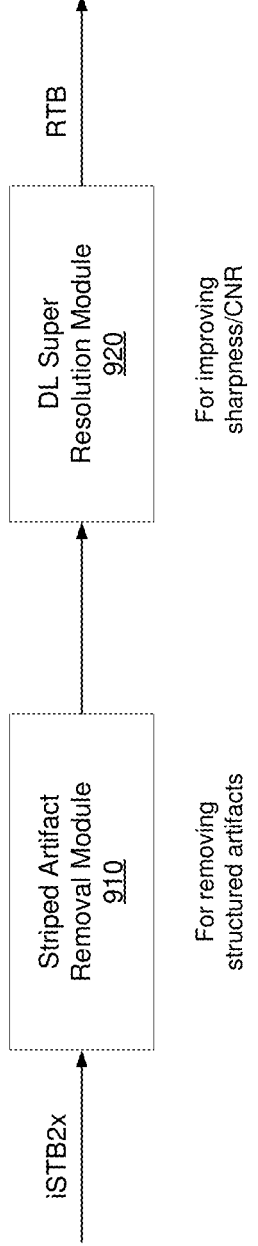
FIG. 9 illustrates an example architecture for azimuth super resolution.

FIG. 9 illustrates an example architecture for azimuth super resolution. Shown in FIG. 9 is architecture 900. In this regard, the architecture 900 may be configured to provide azimuth super resolution. For example, the architecture 900 may be configured to provide transition from sparse Tx STB (STB2x) to Full Tx STB (STB1x)—that is, D1 degradation correction, to Full Tx RTB (RTB)—that is, D2 degradation correction. Nonetheless, while architecture 900 is illustrated and described as providing azimuth super resolution, the disclosure is not limited to azimuth super resolution based architectures, and similar architecture(s) may be used in providing super resolution in other directions, such as elevation. As such, while 2D azimuth-data to train the AI network by emulating what will happen in the elevation direction, the disclosure is not limited or restricted to such azimuth based implementations.

As illustrated in FIG. 9, the architecture 900 comprises a striped artifact removal module 910 and a deep learning (DL) super resolution module 920. In this regard, each of the striped artifact removal module 910 and the deep learning (DL) super resolution module 920 may comprise suitable circuitry for performing the functions described with respect thereto. For example, the striped artifact removal module 910 and the deep learning (DL) super resolution module 920 may be implemented in the signal processor 240 (and/or components thereof, such as the super resolution module 242).

The striped artifact removal module 910 is configured to remove structured artifacts—that is, correct D1 degradation (see above), which correspond to lack of transmit (sparse transmits). The deep learning (DL) super resolution module 920 is configured to improve sharpness/CNR—that is, correct D2 degradation (see above), which correspond to lack of transmit (sparse transmits). Various DL based algorithms and/or techniques may be used. For example, in some implementation, residual channel attention network (RCAN) and/or residual dense network (RDN) may be used for deep learning (DL) processing performed in module 920. In various implementations, both modules are tunable. One or both of the modules may be AI based; one or both of the modules may be configured as classical processing blocks.

Figure 10:
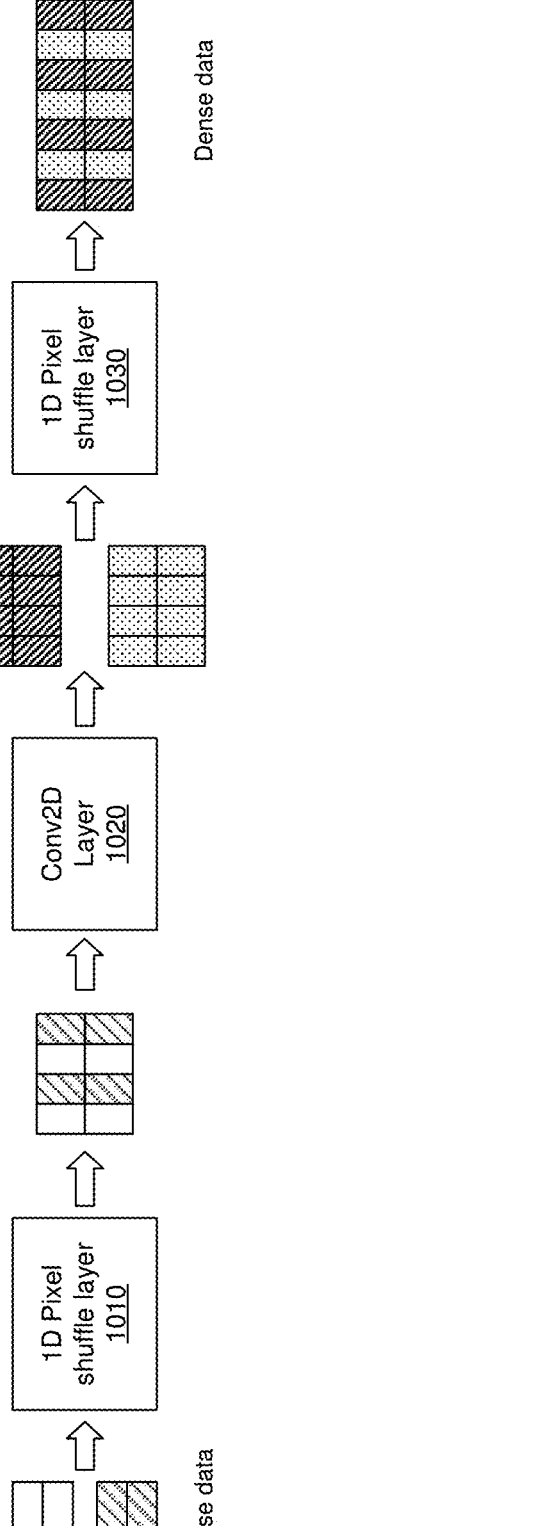
FIG. 10 illustrates an example architecture for upsampling with pixel shuffle layer.

FIG. 10 illustrates an example architecture for upsampling with pixel shuffle layer. Shown in FIG. 10 is architecture 1000. In this regard, the architecture 1000 may be configured to provide upsampling.

As illustrated in FIG. 10, the architecture 1000 comprises a 1D pixel shuffle layer module 1010, a converter-to-2D (Conv2D) layer module 1020, and a 1D pixel shuffle layer module 1030. In this regard, each of the 1D pixel shuffle layer module 1010, the Conv2D layer module 1020, and the 1D pixel shuffle layer module 1030 may comprise suitable circuitry for performing the functions described with respect thereto. For example, the 1D pixel shuffle layer module 1010, the Conv2D layer module 1020, and the 1D pixel shuffle layer module 1030 may be implemented in the signal processor 240 (and/or components thereof, such as the super resolution module 242).

The 1D pixel shuffle layer module 1010, the Conv2D layer module 1020, and the 1D pixel shuffle layer module

1030 may be configured to apply upsampling, particularly to data corresponding images. This may be done to convert sparse data into dense data, which may be done in the course of correcting D1 degradation, for example. In this regard, input to the architecture 1000 is sparse data, which has half the number of columns of the ideal dense data. The number of columns in each frame in the sparse data may be N, the number of columns needed for optimal reconstruction method is 2N. In typical upsampling solutions (e.g., anisotropic upsampling), the lines are typically increased in multiple directions. However, the architecture 1000 is configured to increase lines only in one direction. For example, the 1D pixel shuffle layer module 1010, the Conv2D layer module 1020, and the 1D pixel shuffle layer module 1030 configured to increase the numbers of lines only in the column direction (thus, the number of lines in the depth direction will remain the same).

Figure 11:
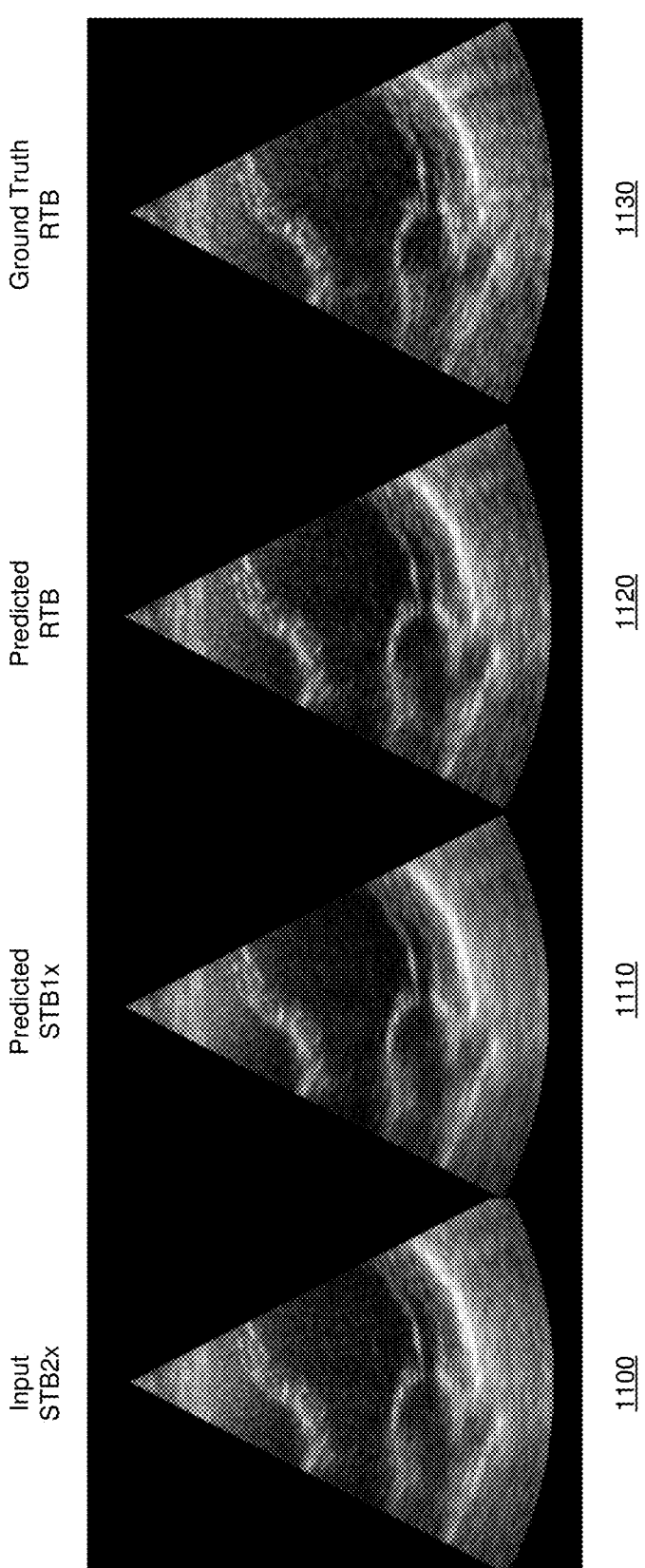
FIG. 11 illustrates example result of applying the degradation corrections on two dimensional (2D) data.

FIG. 11 illustrates example result of applying the degradation corrections on 2D data 2× super resolution. Shown in FIG. 11 are image 1100, image 1110, image 1120, and image 1230. In this regard, image 1130 is generated based on ground truth data (e.g., using data structure 800 in FIG. 8). In other words, image 1130 corresponds to the ideal image. Image 1100 is generated to data as obtained—that is, with D1 degradation and D2 degradation without any correction or mitigation thereof. Image 1110 is generated based on the data once processed to remove structured artifacts—that is, with the D1 degradation addressed, as described above. Image 1120 is generated based on the data once further processed (after correcting D1 degradation) to also improve contrast and sharpness—that is, with the D2 degradation addressed, as described above. As illustrated by these images, applying both D1 degradation correction and D2 degradation correction results in an image that is very similar to, and is a close approximation of an ideal image generated based on the ground truth data.

Figure 12:
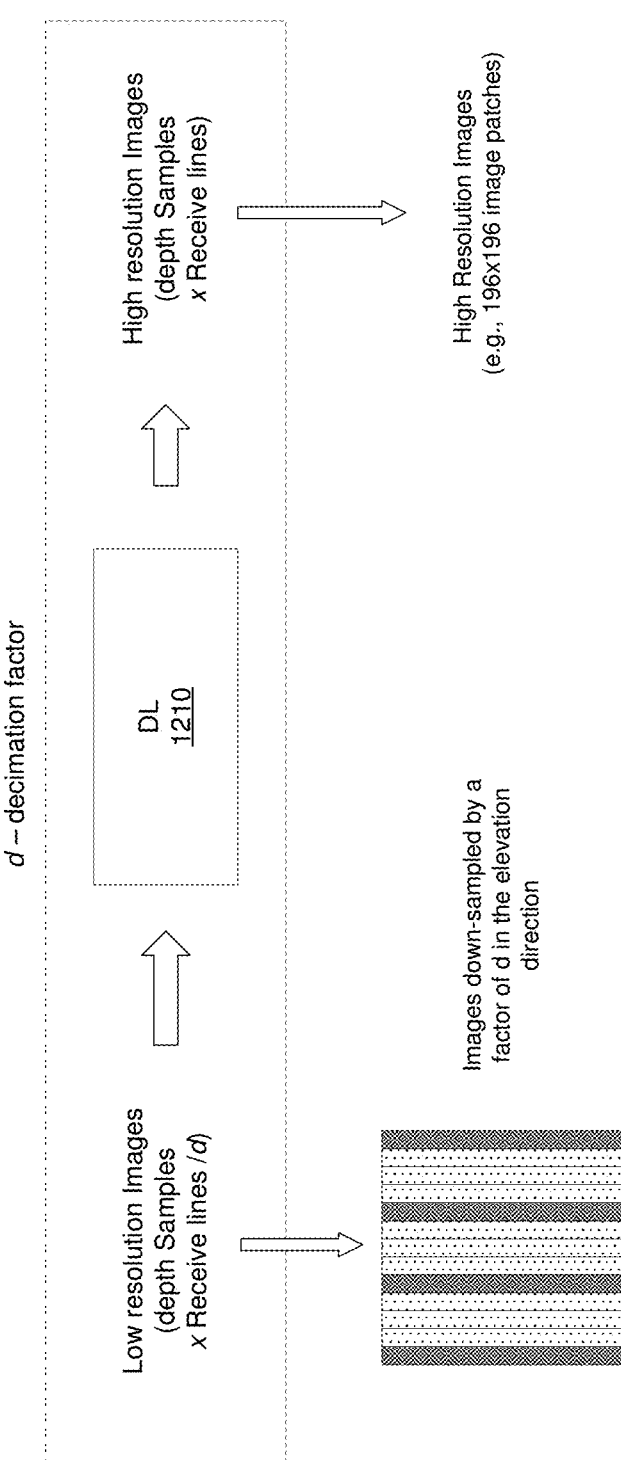
FIG. 12 illustrates an example architecture for reconstruction using sparse acquisitions.

FIG. 12 illustrates an example architecture for reconstruction using sparse acquisitions. Shown in FIG. 12 is architecture 1200. In this regard, the architecture 1200 may be configured to provide reconstruction using sparse acquisitions. For example, the architecture 1200 may be configured to provide reconstruction based on decimation factor d.

As illustrated in FIG. 12, the architecture 1200 comprises a deep learning (DL) reconstruction module 1210. In this regard, the deep learning (DL) reconstruction module 1210 may comprise suitable circuitry for performing the functions described with respect thereto. For example, the DL reconstruction module 1210 may be implemented in the signal processor 240 (and/or components thereof, such as the reconstruction module 242).

The architecture 1200 may be configured for use in conjunction with mechanical probes (e.g., mechanical 3D probes). In this regard, the architecture 1200 may be configured to provide reconstruction using sparse acquisitions, providing, e.g., deep learning-based reconstruction from STB1x to RTB. In particular, with sparse acquisition there may be one directional decimation from dense acquisition, and the dropped transmits may result in lack of physical coverage, whereas there may be no sparsity in the depth axis.

FIG. 13 illustrates a flowchart of an example process for medical imaging with use of super resolution in accordance with the present disclosure. Shown in FIG. 13 is flow chart 1300, comprising a plurality of example steps (represented as blocks 1302-612), which may be performed in a suitable system (e.g., the medical imaging system 110 of FIG. 1, the ultrasound imaging system 200 of FIG. 2, etc.).

In start step 1302, the system may be setup, and operations may initiate.

In step 1304, the imaging functions may be configured based on type of examination and type of probe—e.g., set or adjust number of transmits, set or adjust aperture, etc.

In step 1306, imaging signals may be obtained. For example, in ultrasound imaging system, this may comprise transmitting ultrasound signals, receiving/capturing echoes of the signals, and generating of data based on the captured echoes.

The data corresponding to the obtained imaging signals may be processed, to enable generating and displaying corresponding medical images (e.g., ultrasound images), with the processing including applying D1 degradation related corrections or adjustments, as described above, at step 1308, and applying D2 degradation related corrections or adjustments, as described above, at step 1310.

In step 1312, medical images (e.g., ultrasound images) may be generated based on the processing of the data corresponding to the obtained imaging signals. In this regard, due to applying of D1 degradation related corrections or adjustments and/or D2 degradation related corrections or adjustments, these generated medical images may have improved image quality compared to medical images that would have been generated without any D1 and D2 based corrections.

In step 1314, the improved medical images are displayed. The process may then terminate in end step 1316. In this regard, the terminating of the process may comprise continuing imaging operations, repeating the processing for improved medical images (e.g., steps 1304-612), or simply terminating all imaging operations.

An example method, in accordance with the present disclosure, comprises: acquiring signals based on a medical imaging technique during medical imaging based examination of a patient; determining one or more outputting parameters associated with outputting of corresponding medical imaging; processing, based on the one or more outputting parameters, data corresponding to the acquired signals, wherein the processing comprises one or both of: applying a first type of correction to address a first type of degradation, wherein the first type of degradation is based on or caused by sparse acquisition; and applying a second type of correction to address a second type of degradation, wherein the second type of degradation is based on or caused by choice of beamforming/reconstruction methodology; and generating based on the processing of the data, one or more improved medical images.

In an example embodiment, the method further comprises applying one or both of the first type of correction and the second type of correction comprises use of artificial intelligence (AI) based processing.

In an example embodiment, the method further comprises, when applying the artificial intelligence (AI) based processing, applying deep learning (DL) based processing.

In an example embodiment, the method further comprises, when applying the deep learning based processing, applying a deep learning (DL) based modeling.

In an example embodiment, the method further comprises configuring the artificial intelligence (AI) based processing based on training data.

In an example embodiment, the method further comprises generating the training data based on acquired medical imaging data.

In an example embodiment, the method further comprises, when generating the training data, generating compromised and ground truth datasets based on same acquired medical imaging data.

In an example embodiment, the method further comprises determining at least one outputting parameter based on a type of the medical imaging based examination and/or conditions relating to the medical imaging based examination.

In an example embodiment, the method further comprises controlling one or more acquisition related parameters.

In an example embodiment, the method further comprises, when controlling the one or more acquisition related parameters, setting or adjusting a number of transmits used during the acquiring of the signals.

In an example embodiment, the method further comprises, when controlling the one or more acquisition related parameters, setting or adjusting an aperture used during the acquiring of the signals.

In an example embodiment, the method further comprises applying one or both of the first type of correction and the second type of correction comprises applying super resolution.

In an example embodiment, the method further comprises applying one or both of the first type of correction and the second type of correction comprises upsampling using pixel shuffling.

An example system, in accordance with the present disclosure, comprises: a scanner configured to acquire imaging signals based on a medical imaging technique during medical imaging based examination of a patient; and one or more circuits configured to: determine one or more outputting parameters associated with outputting of corresponding medical imaging; process, based on the one or more outputting parameters, data corresponding to the acquired signals, wherein the processing comprises one or both of: applying a first type of correction to address a first type of degradation, wherein the first type of degradation is based on or caused by sparse acquisition; and applying a second type of correction to address a second type of degradation, wherein the second type of degradation is based on or caused by choice of beamforming/reconstruction methodology; and generate based on the processing of the data, one or more improved medical images.

In an example embodiment, the one or more circuits are further configured to apply one or both of the first type of correction and the second type of correction comprises use of artificial intelligence (AI) based processing.

In an example embodiment, the one or more circuits are further configured to apply the artificial intelligence (AI) based processing comprises applying deep learning (DL) based processing.

In an example embodiment, the one or more circuits are further configured to, when applying the deep learning based processing, apply a deep learning (DL) based modeling.

In an example embodiment, the one or more circuits are further configured to configure the artificial intelligence (AI) based processing based on training data.

In an example embodiment, the one or more circuits are further configured to generate the training data based on acquired medical imaging data.

In an example embodiment, the one or more circuits are further configured to, when generating the training data, generate compromised and ground truth datasets based on same acquired medical imaging data.

In an example embodiment, the one or more circuits are further configured to determine at least one outputting parameter based on a type of the medical imaging based examination and/or conditions relating to the medical imaging based examination.

In an example embodiment, the one or more circuits are further configured to control one or more acquisition related parameters.

In an example embodiment, the one or more circuits are further configured to, when controlling the one or more acquisition related parameters, set or adjust a number of transmits used during the acquiring of the signals.

In an example embodiment, the one or more circuits are further configured to, when controlling the one or more acquisition related parameters, set or adjust an aperture used during the acquiring of the signals.

In an example embodiment, the one or more circuits are further configured to, when applying one or both of the first type of correction and the second type of correction, apply super resolution.

In an example embodiment, the one or more circuits are further configured to, when applying one or both of the first type of correction and the second type of correction, apply upsampling using pixel shuffling.

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the terms "block" and "module" refer to functions than can be performed by one or more circuits. As utilized herein, the term "exemplary" means serving as a non-limiting example, instance, or illustration. As utilized herein, the terms "for example" and "e.g.," set off lists of one or more non-limiting examples, instances, or illustrations. As utilized herein, circuitry is "operable" to perform a function whenever the circuitry comprises the necessary hardware (and code, if any is necessary) to perform the function, regardless of whether performance of the function is disabled or not enabled (e.g., by some user-configurable setting, a factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present disclosure may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:

acquiring, via an ultrasound probe, ultrasound data in a plurality of planes oriented in a first direction with respect to the ultrasound probe in order to generate a volume of ultrasound data;

adjusting the volume of ultrasound data in a second direction with respect to the ultrasound probe, to generate an adjusted volume of ultrasound data, based on a processing model, wherein the second direction is different from the first direction, and wherein the processing model is trained using training data acquired along one or more planes oriented in the first direction with respect to the ultrasound probe;

generating an ultrasound image based on the adjusted volume of ultrasound data; and displaying the ultrasound image via a display.

2. The method of claim 1, wherein the first direction is one of an azimuth direction, an elevation direction, and a depth direction, and the second direction is a different one of the azimuth direction, the elevation direction, and the depth direction.

3. The method of claim 1, wherein the adjusting of the volume of the ultrasound data in the second direction improves a resolution of the volume of ultrasound data in the second direction with respect to the probe.

4. The method of claim 1, wherein the training data comprises two-dimensional (2D) ultrasound data.

5. The method of claim 1, wherein the training data is generated based on compromised and ground truth datasets based on a same acquired ultrasound imaging data.

6. The method of claim 1, wherein the processing model is configured for artificial intelligence (AI) based processing of ultrasound data.

7. The method of claim 6, wherein the artificial intelligence (AI) based processing comprises deep learning (DL) based processing of ultrasound data.

8. The method of claim 1, wherein the processing model is trained to determine data for adjusting the volume of ultrasound data in the second direction based on inference.

9. The method of claim 1, wherein said adjusting the volume of ultrasound data comprises applying one or both of:

a first type of correction to address a first type of degradation, wherein the first type of degradation is based on or caused by sparse acquisition; and a second type of correction to address a second type of degradation, wherein the second type of degradation is based on or caused by choice of beamforming and/or reconstruction methodology.

10. The method of claim 1, further comprising controlling one or more acquisition related parameters.

11. An ultrasound imaging system comprising:

a probe configured to acquire ultrasound data;

a display configured to display ultrasound images; and one or more circuits configured to:

acquire, via the ultrasound probe, ultrasound data in a plurality of planes oriented in a first direction with respect to the ultrasound probe in order to generate a volume of ultrasound data;

adjust the volume of ultrasound data in a second direction with respect to the ultrasound probe, to generate an adjusted volume of ultrasound data, based on a processing model, wherein the second direction is different from the first direction, and wherein the processing model is trained using training data acquired along one or more planes oriented in the first direction with respect to the ultrasound probe;

generate an ultrasound image based on the adjusted volume of ultrasound data; and display the ultrasound image via the display.

12. The system of claim 11, wherein the first direction is one of an azimuth direction, an elevation direction, and a depth direction, and the second direction is a different one of the azimuth direction, the elevation direction, and the depth direction.

13. The system of claim 11, wherein the adjusting of the volume of the ultrasound data in the second direction improves a resolution of the volume of ultrasound data in the second direction with respect to the probe.

14. The system of claim 11, wherein the training data comprises two-dimensional (2D) ultrasound data.

15. The system of claim 11, wherein the training data is generated based on compromised and ground truth datasets based on a same acquired ultrasound imaging data.

16. The system of claim 11, wherein the processing model is configured for artificial intelligence (AI) based processing of ultrasound data.

17. The system of claim 16, wherein the artificial intelligence (AI) based processing comprises deep learning (DL) based processing of ultrasound data.

18. The system of claim 11, wherein the processing model is trained to determine data for adjusting the volume of ultrasound data in the second direction based on inference.

19. The system of claim 11, wherein the one or more circuits are further configured to, when adjusting the volume of ultrasound data, apply one or both of:

a first type of correction to address a first type of degradation, wherein the first type of degradation is based on or caused by sparse acquisition; and a second type of correction to address a second type of degradation, wherein the second type of degradation is based on or caused by choice of beamforming and/or reconstruction methodology.

20. The system of claim 11, wherein the one or more circuits are further configured to control one or more acquisition related parameters.

* * * * *